US012214553B2

(12) United States Patent
Prucha et al.

(10) Patent No.: US 12,214,553 B2
(45) Date of Patent: Feb. 4, 2025

(54) SYSTEM FOR WINDOW SEPARATION IN AN ADDITIVE MANUFACTURING PROCESS

(71) Applicant: Stratasys, Inc., Eden Prairie, MN (US)

(72) Inventors: Christopher Prucha, San Francisco, CA (US); Joel Ong, San Francisco, CA (US); John Paton, Eden Prairie, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 17/965,699

(22) Filed: Oct. 13, 2022

(65) Prior Publication Data

US 2023/0035689 A1 Feb. 2, 2023

Related U.S. Application Data

(63) Continuation of application No. 17/388,598, filed on Jul. 29, 2021, now Pat. No. 11,878,472, which is a
(Continued)

(51) Int. Cl.
*B29C 64/364* (2017.01)
*B01D 71/32* (2006.01)
(Continued)

(52) U.S. Cl.
CPC ............ *B29C 64/364* (2017.08); *B01D 71/32* (2013.01); *B29C 64/135* (2017.08);
(Continued)

(58) Field of Classification Search
CPC .. B01D 2313/20; B01D 63/081; B01D 71/32; B29C 64/135; B29C 64/245;
(Continued)

(56) References Cited

U.S. PATENT DOCUMENTS

2012/0195994 A1* 8/2012 El-Siblani ............. B29C 64/357
15/320
2016/0303795 A1* 10/2016 Liu ....................... B29C 64/364
(Continued)

FOREIGN PATENT DOCUMENTS

WO 2018006029 A1 1/2018

OTHER PUBLICATIONS

ESSR received in EP App. No. 19879943.9 dated Jul. 18, 2022.

*Primary Examiner* — Emmanuel S Luk
*Assistant Examiner* — Victoria Bartlett
(74) *Attorney, Agent, or Firm* — Run8 Patent Group, LLC; Peter Miller; Leah Raddatz

(57) ABSTRACT

An additive manufacturing system including a base assembly and a tray assembly. The base assembly includes a build window, substantially transparent to electromagnetic radiation; a projection system configured to project electromagnetic radiation toward an upper surface of the build window; and a tray seat arranged around a perimeter of the build window. The tray assembly is configured to engage with the base assembly in an engaged configuration and includes: a tray structure defining a registration feature configured to engage the tray seat to locate an aperture proximal to the upper surface of the build window in the engaged configuration; and a separation membrane that is configured to laminate across the upper surface of the build window in response to an evacuation of gas from an interstitial region and configured to separate from the build window in response to injection of gas into the interstitial region.

20 Claims, 11 Drawing Sheets

Related U.S. Application Data continuation of application No. 16/672,415, filed on Nov. 1, 2019, now Pat. No. 11,104,075.

(60) Provisional application No. 62/754,430, filed on Nov. 1, 2018.

(51) Int. Cl.
| | |
|---|---|
| *B29C 64/135* | (2017.01) |
| *B29C 64/245* | (2017.01) |
| *B29C 64/25* | (2017.01) |
| *B29C 64/255* | (2017.01) |
| *B29C 64/379* | (2017.01) |
| *B33Y 30/00* | (2015.01) |

(52) U.S. Cl.
CPC ............ *B29C 64/245* (2017.08); *B29C 64/25* (2017.08); *B29C 64/255* (2017.08); *B29C 64/379* (2017.08); *B33Y 30/00* (2014.12); *B01D 2313/203* (2022.08)

(58) Field of Classification Search
CPC ..... B29C 64/25; B29C 64/255; B29C 64/364; B29C 64/379; B29C 64/223; B29C 64/124; B29C 64/106; B33Y 10/00; B33Y 30/00
See application file for complete search history.

(56) References Cited

U.S. PATENT DOCUMENTS

| | | | |
|---|---|---|---|
| 2017/0297261 A1 | 10/2017 | Schultheiss et al. | |
| 2018/0029296 A1* | 2/2018 | Van Esbroeck | B29C 64/286 |
| 2019/0270243 A1* | 9/2019 | El-Siblani | B29C 64/255 |
| 2019/0366635 A1* | 12/2019 | Holt | B29C 64/264 |

* cited by examiner

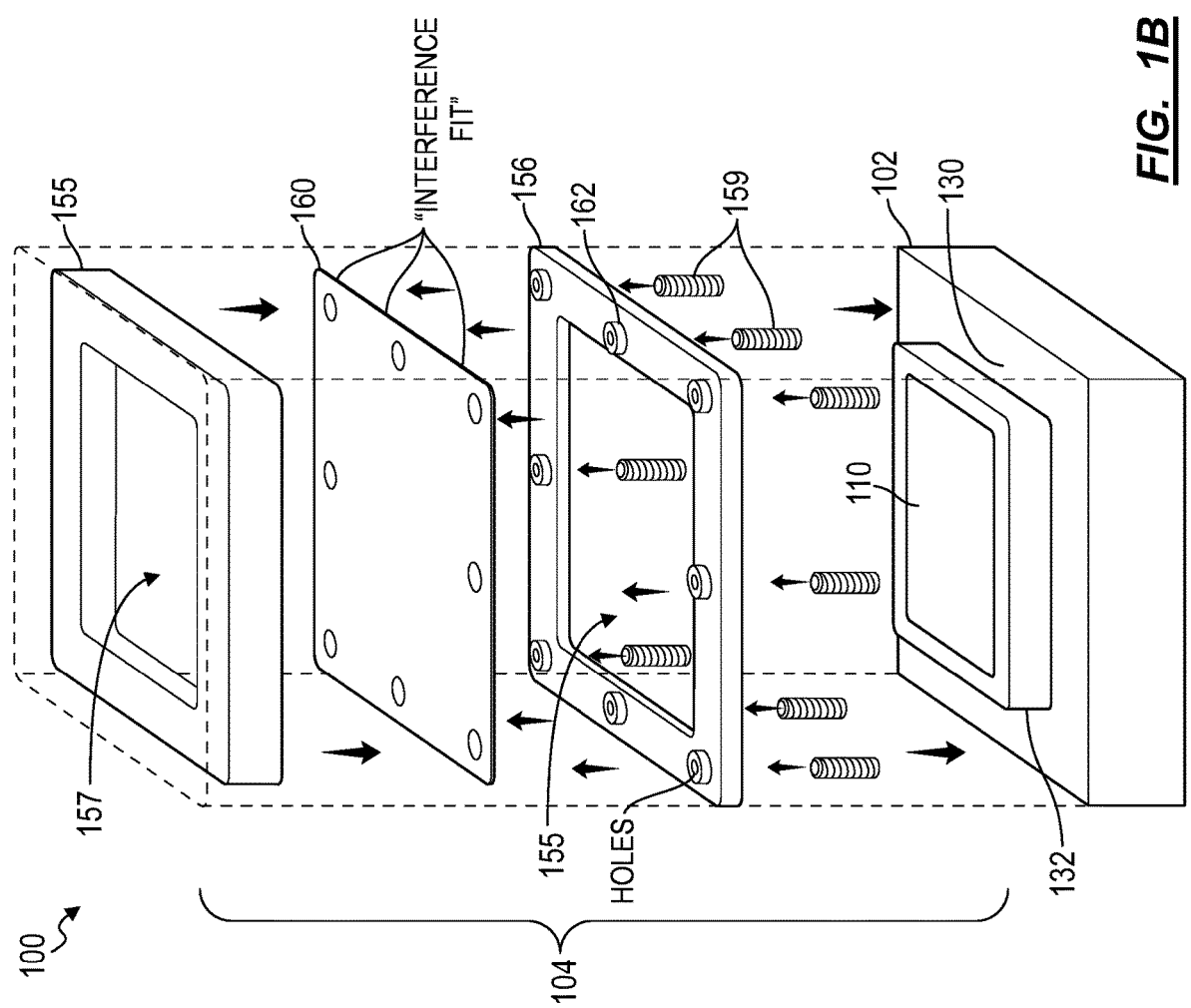

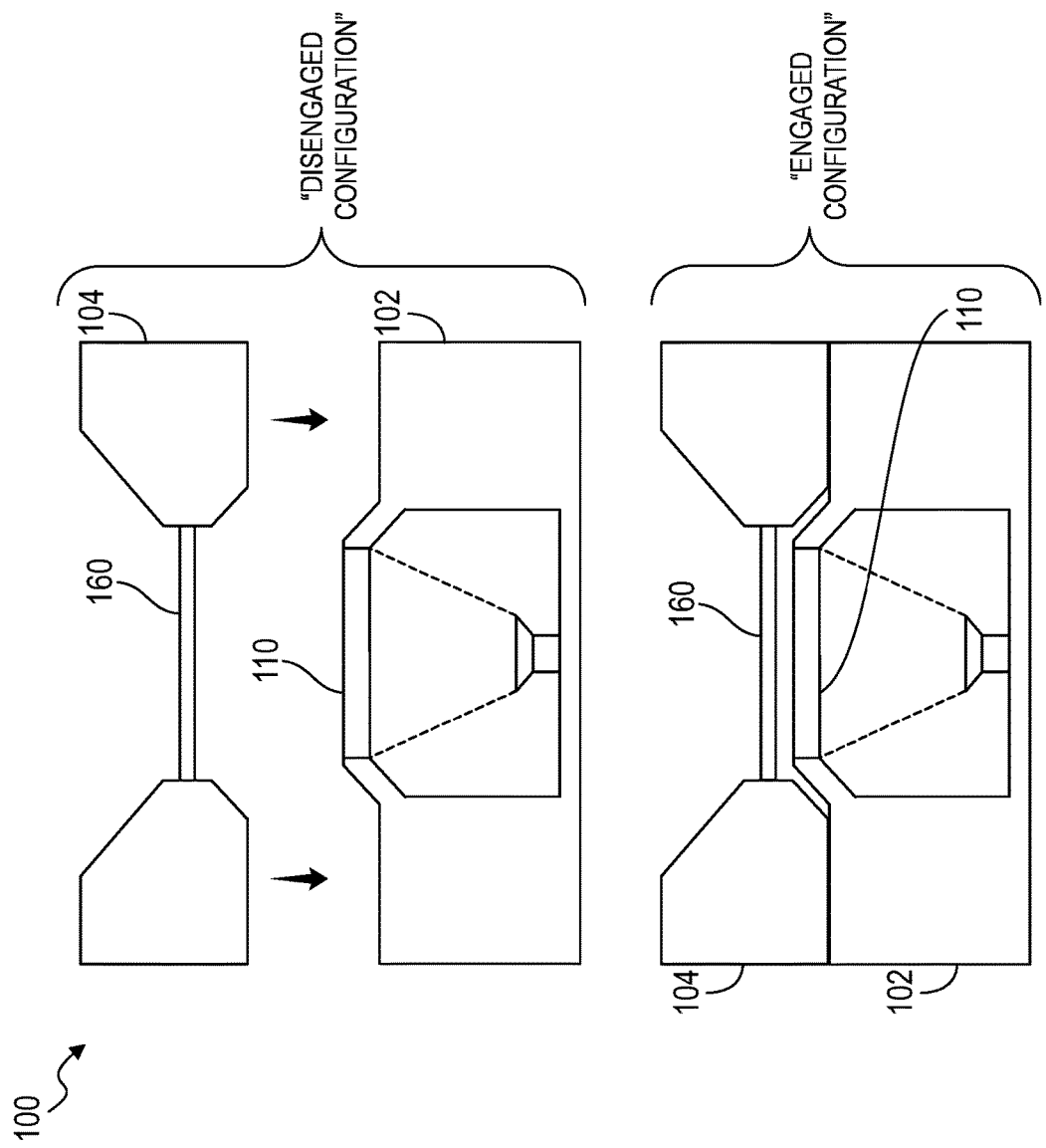

SYSTEM FOR WINDOW SEPARATION IN AN ADDITIVE MANUFACTURING PROCESS

CROSS-REFERENCE TO RELATED APPLICATIONS

This application is a continuation of U.S. patent application Ser. No. 17/388,598, filed on 6 Aug. 2021, which is a continuation of U.S. patent application Ser. No. 16/672,415, filed on 1 Nov. 2019, which claims the benefit of U.S. Provisional Application No. 62/754,430, filed on 1 Nov. 2018, each of which is incorporated in its entirety by this reference.

TECHNICAL FIELD

This invention relates generally to the field of additive manufacturing and more specifically to a new and useful system for part separation in a digital light process in the field of additive manufacturing.

BRIEF DESCRIPTION OF THE FIGURES

FIGS. 1A and 1B are schematic representations of a system;
FIGS. 3A and 3B is a schematic representation of the system.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1A:
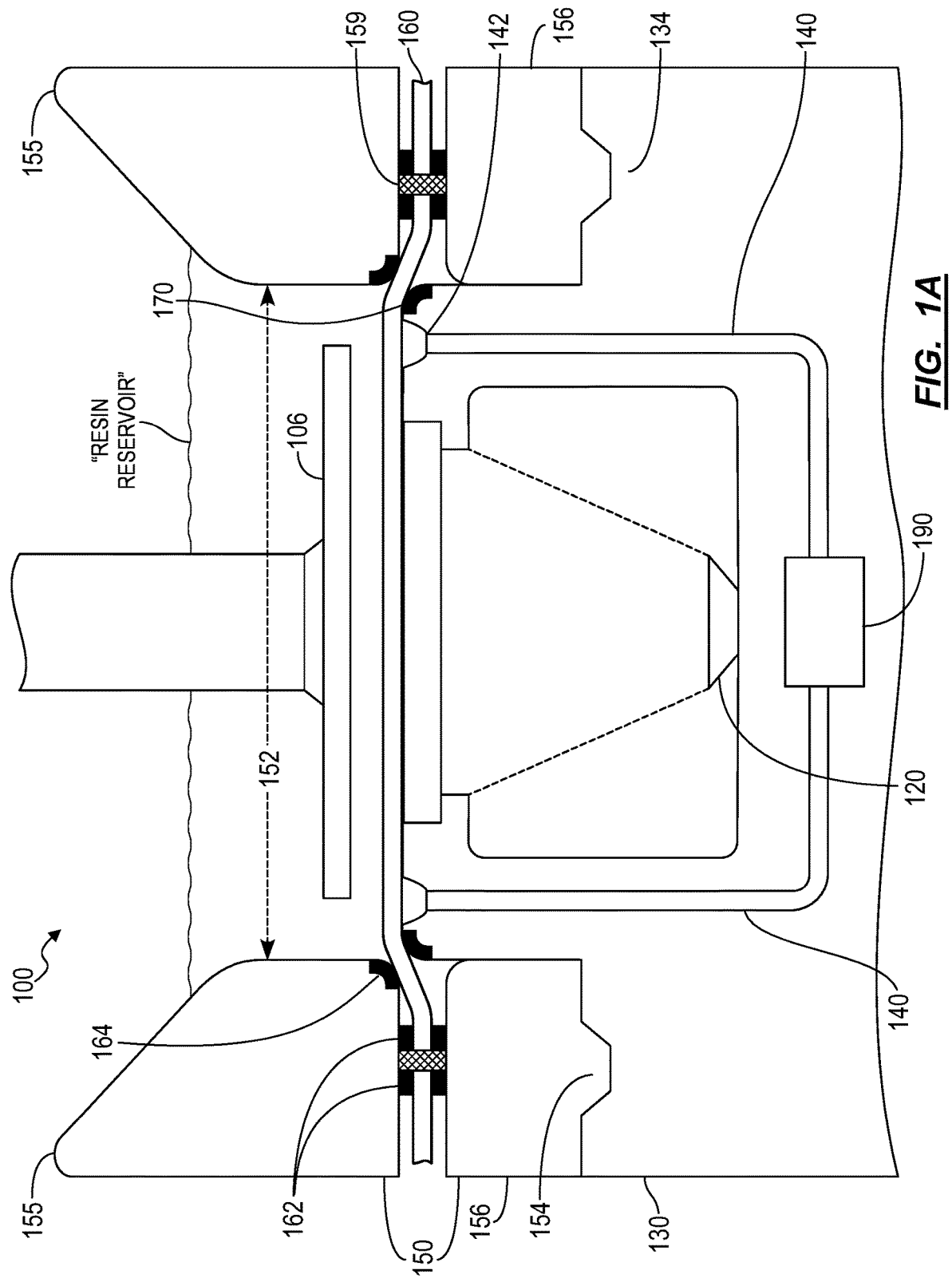

As shown in FIG. 1A, a system 100 for additive manufacturing includes a base assembly 102 and a tray assembly 104. The base assembly 102 includes: a build window 110 that is substantially transparent to electromagnetic radiation within a photo-initiating range; a projection system 120 arranged beneath a lower surface of the build window 110, and configured to project electromagnetic radiation within the photo-initiating range toward an upper surface of the build window 110; a tray seat 130 arranged around a perimeter of the build window 110; and a fluid distribution port 140 arranged proximal to the build window no. The tray assembly 104 is configured to engage with the base assembly 102 in an engaged configuration and includes a tray structure 150 and a separation membrane 160. The tray structure 150: defines an aperture 152 and a registration feature 154 configured to engage the tray seat 130 to locate the aperture 152 proximal to the upper surface of the build window 110 in the engaged configuration. The separation membrane 160 is: tensioned across the aperture 152; configured to laminate across the upper surface of the build window no in response to an evacuation of gas, via the fluid distribution port 140, from an interstitial region between the base assembly 102 and the tray assembly 104 in the engaged configuration; and configured to separate from the build window no in response to injection of gas, via the fluid distribution port 140, into the interstitial region.

Also shown in FIG. 1A, the additive manufacturing system 100 can additionally include the base assembly 102, which further includes: a build platform 106 defining a planar surface opposite and substantially parallel to the upper surface of the build window no; and a linear actuation system configured to vertically translate the build platform 106 relative to the build window no.

As shown in FIG. 1B, one variation of the additive manufacturing system 100 includes a tray assembly 104 configured to engage with a base assembly 102 in an engaged configuration, the tray assembly 104 including: an upper member 155 defining a first aperture 157, the first aperture 157 defining sidewalls of an interior volume configured to contain a reservoir of a resin; a lower member 156 fastened to a bottom surface of the upper member 155, defining a second aperture 158 circumscribing the first aperture 157, and defining a registration feature 154 configured to engage with the base assembly 102 in the engaged configuration; and a separation membrane 160 substantially transparent to electromagnetic radiation within a photo-initiating range, fastened between the upper member 155 and the lower member 156 in an interference fit configured to tension the separation membrane 160 across the first aperture 157 and the second aperture 158, and defining a floor of the interior volume.

Figure 4A:
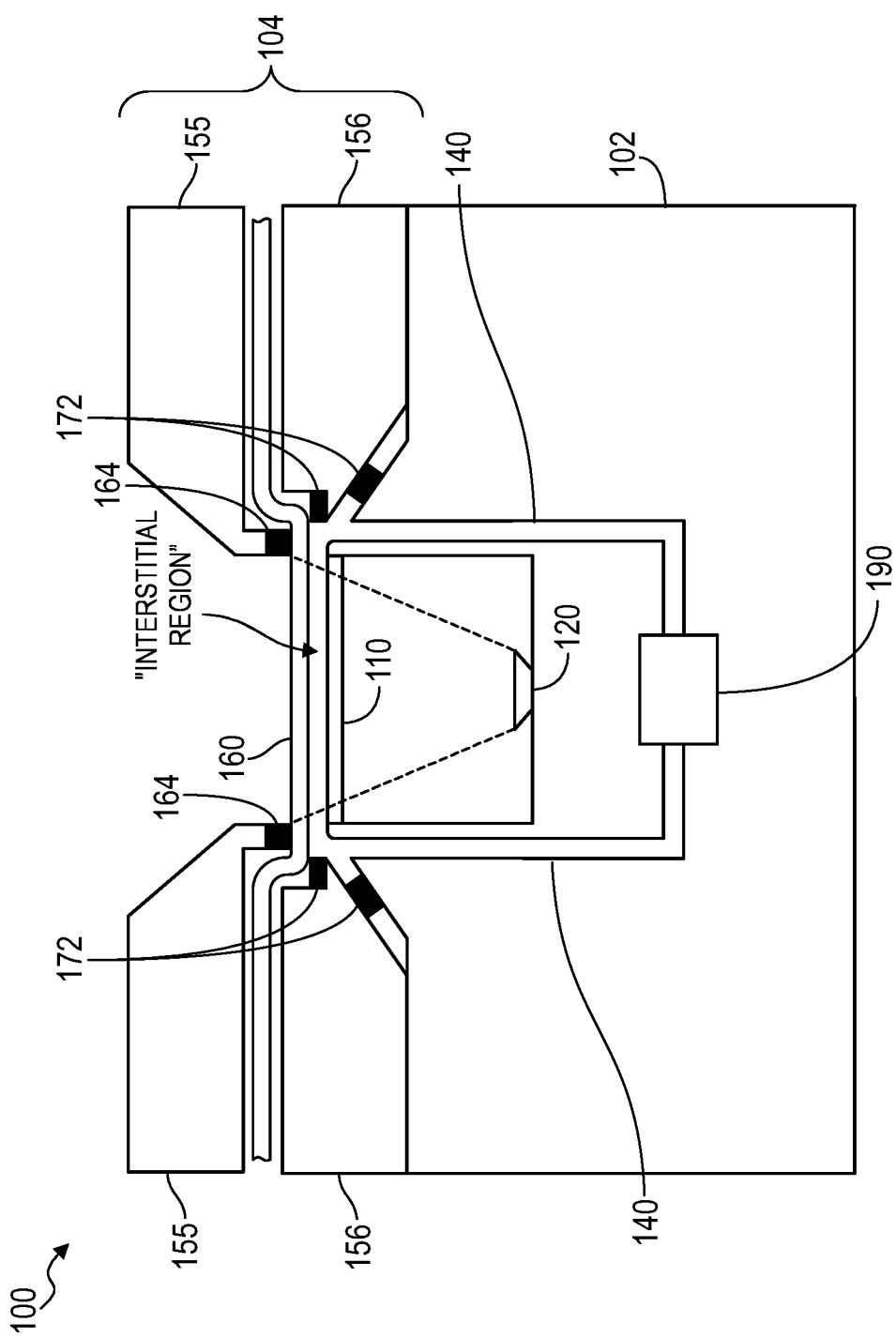
FIGS. 4A and 4B are schematic representations of the system.
Figure 4B:
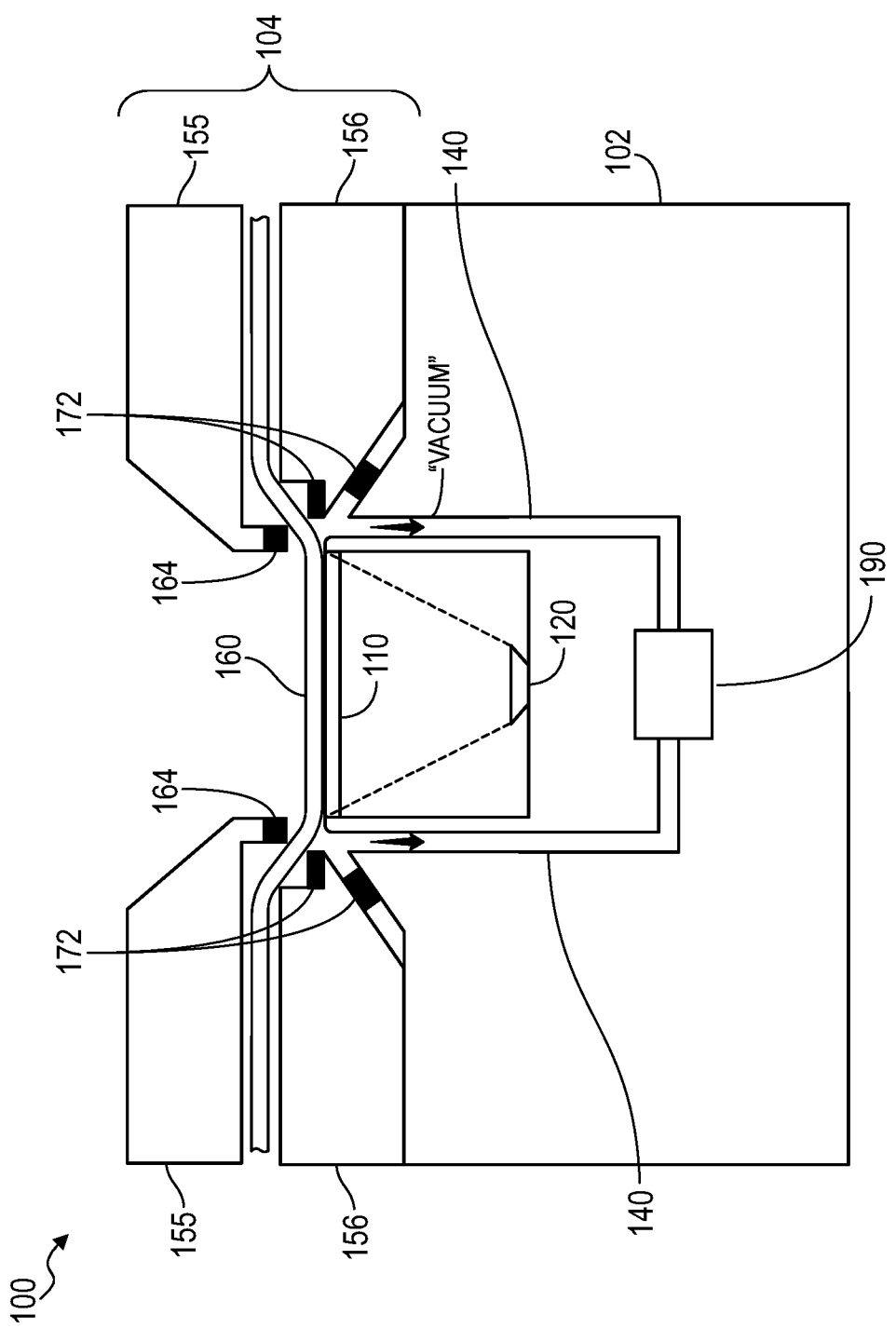

As shown in FIGS. 4A and 4B, one variation of the additive manufacturing system 100 includes the base assembly 102, which further includes an interstitial gasket 170: circumscribing the fluid distribution port 140 and the build window 110; configured to contact the separation membrane 160 in the engaged configuration; and configured to seal gas within the interstitial region up to a maximum differential pressure greater than a maximum operating pressure.

Figure 5A:
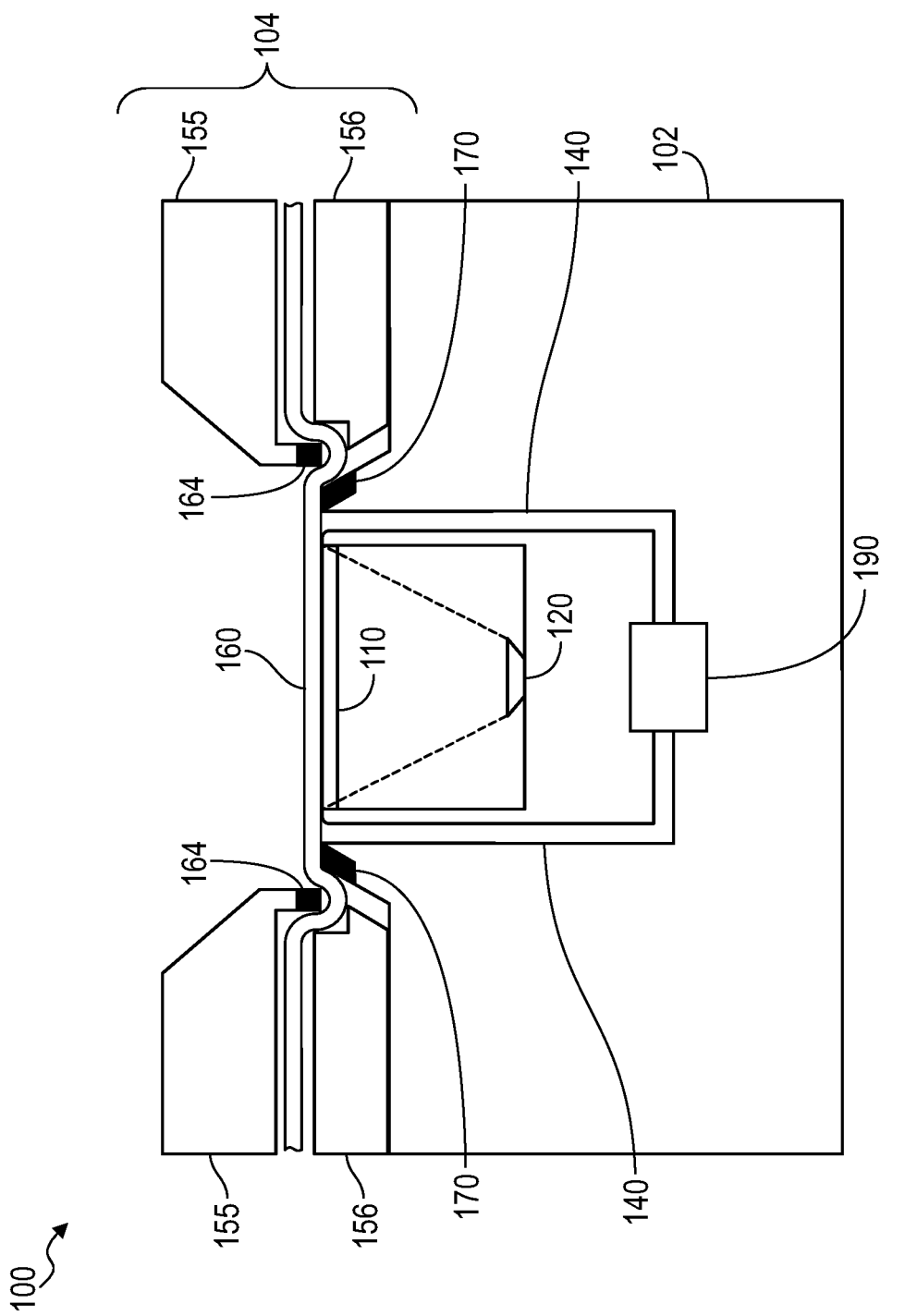
FIGS. 5A and 5B are schematic representations of the system.
Figure 5B:
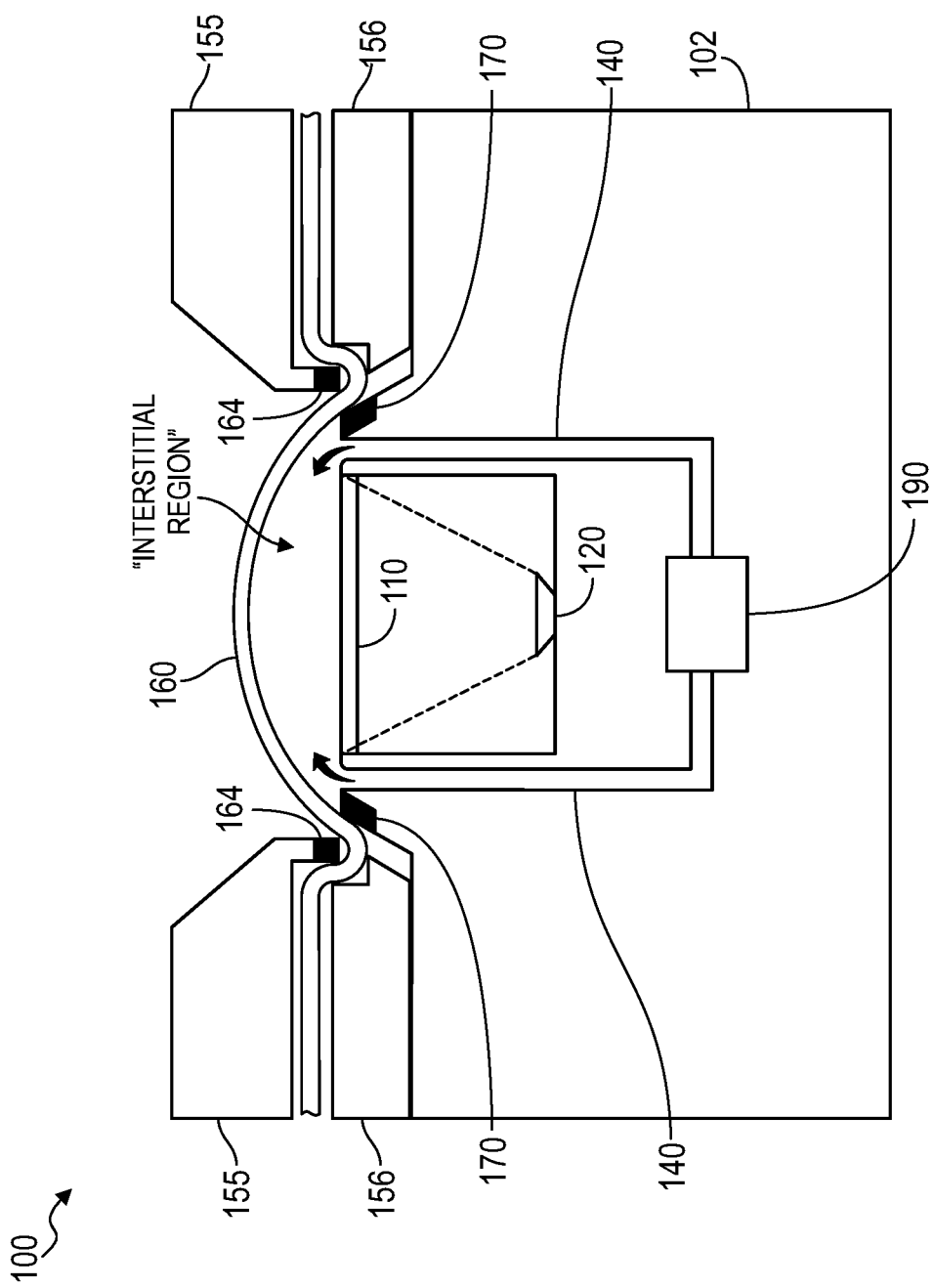

As shown in FIGS. 5A and 5B, one variation of the additive manufacturing system 100 includes the base assembly 102, which further includes an interface gasket 172: arranged between a lower surface of the tray structure 150 and an upper surface of the tray seat 130; circumscribing the aperture 152, the fluid distribution port 140, and the build window 110 in the engaged configuration; and configured to seal gas within the interstitial region up to a maximum differential pressure greater than a maximum operating pressure.

Figure 6:
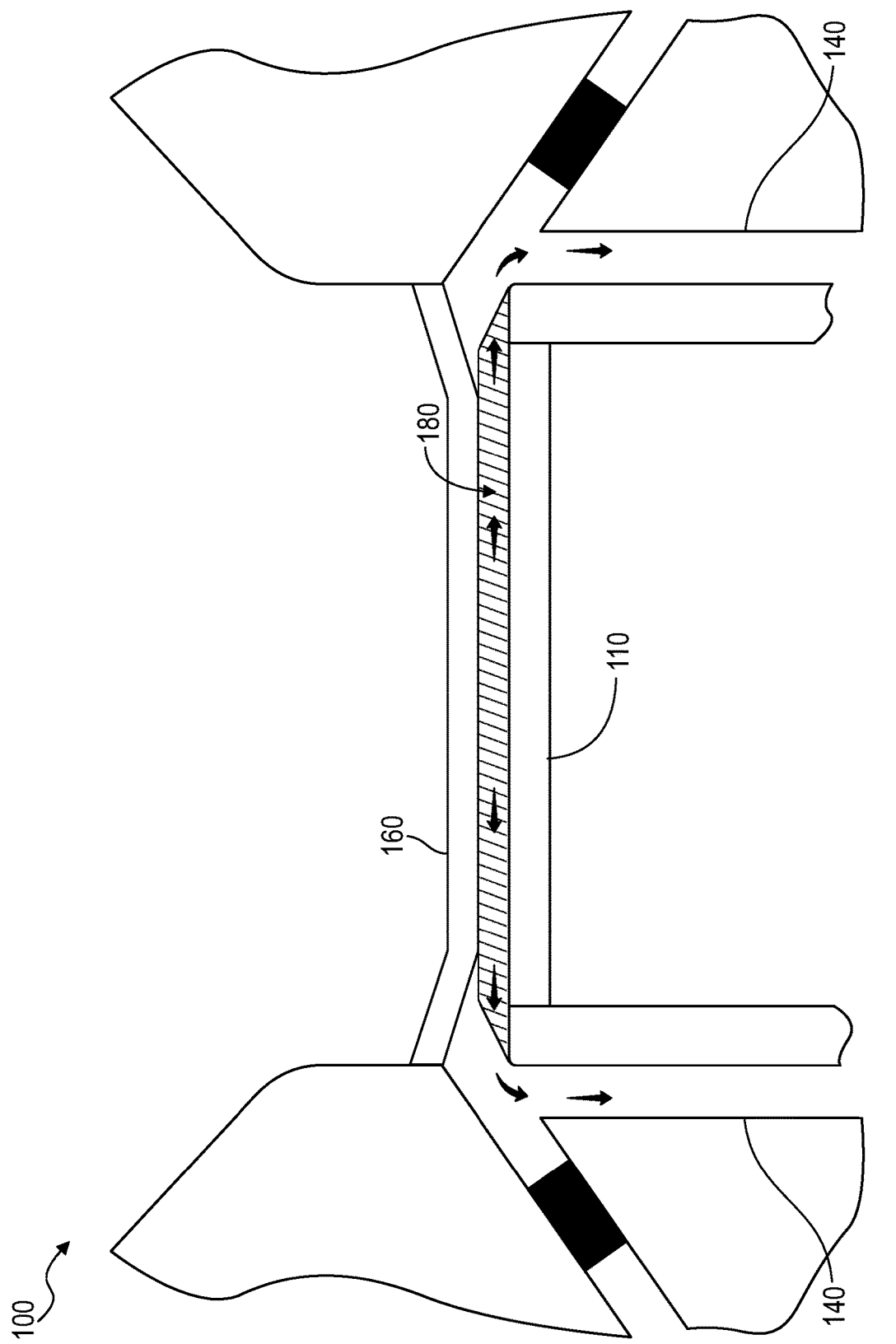
FIG. 6 is a schematic representation of the system.

As shown in FIG. 6, one variation of the additive manufacturing system 100 includes a gas-permeable layer 180, which is: substantially transparent to electromagnetic radiation within the photo-initiating range; arranged over the upper surface of the build window no; and configured to maintain a minimum interstitial volume within the interstitial region between the build window 110 and the separation membrane 160 in the engaged configuration.

Figure 7:
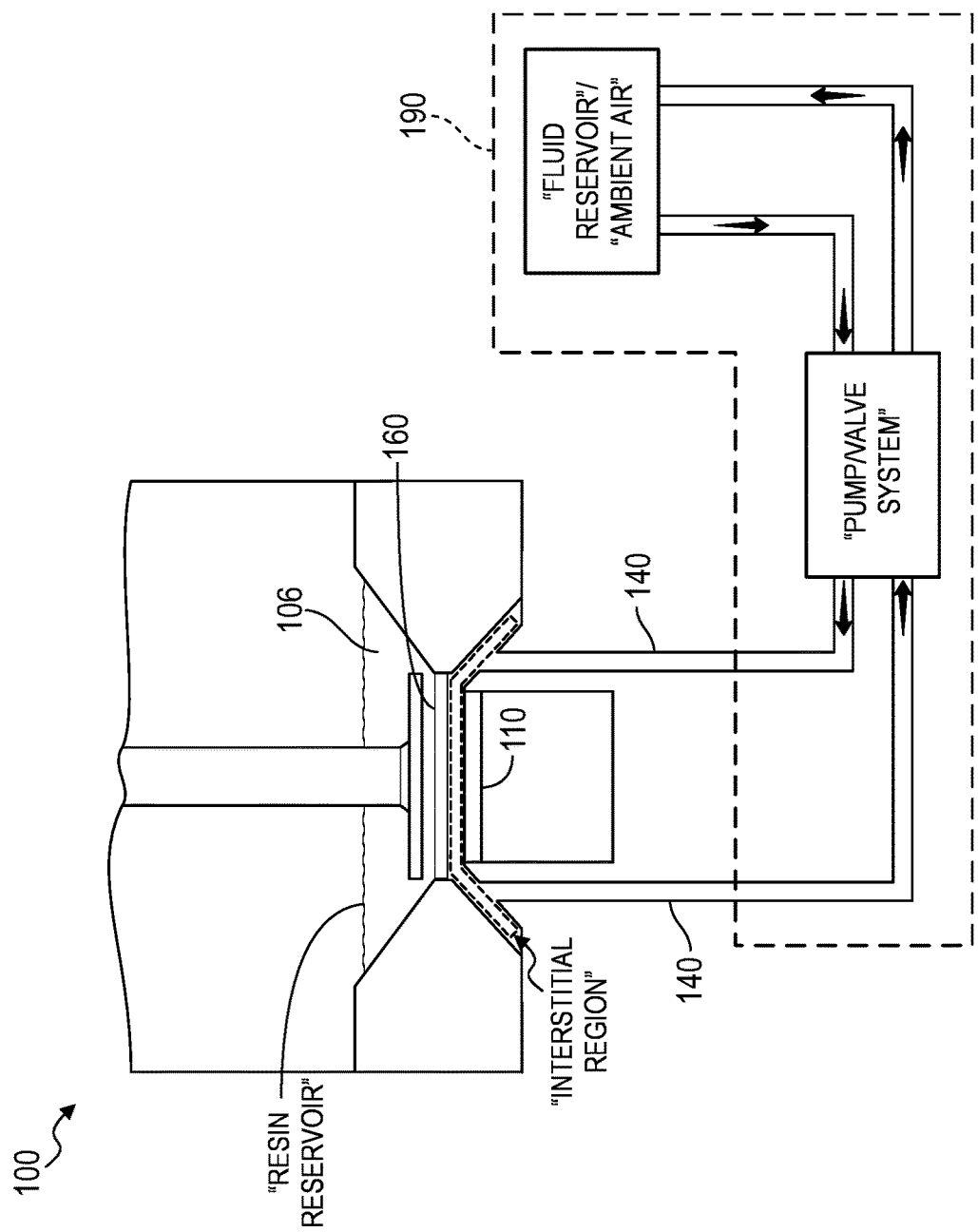
FIG. 7 is a schematic representation of the system.

As shown in FIG. 7, one variation of the additive manufacturing system 100 includes a pressure regulation system 190, which is: fluidically coupled to the fluid distribution port 140; configured to inject gas into the interstitial region to separate the separation membrane 160 from the build window 110 in the engaged configuration and during a separation phase; and configured to evacuate gas from the interstitial region to laminate the separation membrane 160 to the build window 110 in the engaged configuration and during a lamination phase.

2. Applications

Generally, an additive manufacturing system 100 (hereinafter "the system 100") selectively irradiates resin, via a stereolithographic process—such as a digital light process (hereinafter "DLP") or a continuous digital light process (hereinafter "CDLP")—to cure successive layers of a solid, physical object or set of objects (hereinafter "a build"). In a standard bottom-up stereolithographic additive manufacturing system, a layer of resin may tend to adhere (or "stick") to the surface of a build window 110 within this additive manufacturing system 100 when photocured (e.g., via exposure to UV light); this layer of cured resin is then separated from the build window 110 prior to advancement of a build platform 106 (to which the build is adhered) and prior to introducing and photocuring a subsequent layer of resin. The resulting force from this separation can: deform the intermediate state of the ongoing build (in its "green" state) or newly formed layers of the build resulting in poor dimensional accuracy; increase the probability of build failure; and reduce print speeds, amongst other issues. The system 100 reduces these separation forces via inclusion of a replaceable separation membrane 160 (laminated over the upper surface of the build window no during a photocuring phase of a build process), which functions to limit adhesion forces (e.g., Stefan adhesion and suction forces) between newly cured layers of the build and the build window no. Additionally, the system 100 includes a pressure regulation system 190 (e.g., a compressor, pump, and/or valve system) to selectively inject fluid (e.g., gas or liquid) into an interstitial region between the build window 110 and the separation membrane 160 to aid separation of a newly cured layer of the build from the separation membrane 160 and build window no during advancement of a build platform 106.

In particular, the system 100 includes a base assembly 102 and a tray assembly 104 that, while in an engaged configuration, fluidically seal (e.g., pneumatically or hydraulically seal within an operating pressure range) the interstitial region between the separation membrane 160 and the build window no, thereby enabling inflation of this region by the pressure regulation system 190. The base assembly 102 defines the overall structure of the system 100 and includes a set of electromechanical components such as the build window no, the build platform 106, a projection system 120 (e.g., a UV or near UV projection system), a tray seat 130, a fluid distribution port 140, and the pressure regulation system 190. The structure of the base assembly 102: locates the build window no relative to the build platform 106 and preserves parallelism therebetween; locates the build window no relative to the projection system 120 and preserves alignment therebetween (e.g., parallelism, and depth of the build window no relative to the focal length of the projection system 120); and defines a window platform 132 that elevates the build window no above the surrounding tray seat 130. The build window no spans (at least partially) an opening in the window platform 132 and defines a rigid structure that is substantially transparent to ultraviolet light (e.g., borosilicate glass). Thus, the upper surface of the build window no defines a horizontal reference plane parallel to a lower surface of the build platform 106.

The tray assembly 104 includes components—such as the tray structure 150 and the separation membrane 160—and is configured to fit onto the tray seat 130 of the base assembly 102 in the engaged configuration, thereby positioning the separation membrane 160 over the build window 110 and sealing the interstitial region (e.g., via a set of gaskets arranged on the tray assembly 104 and or the base assembly 102). In the engaged configuration, the tray assembly 104 tensions the separation membrane 160 over the build window 110 such that the separation membrane 160 can: laminate across the upper surface of the build window no in response to an evacuation of fluid from the interstitial region; and can separate from the build window no in response to an injection of fluid into the interstitial region. Furthermore, the tray structure 150 defines an interior volume, of which the separation membrane 160 forms the floor, that contains a reservoir of resin.

Prior to initiating a new build cycle to produce a new physical build, a user may install a separation membrane 160—of a material, thickness, and/or elasticity matched to the resin chemistry selected for this new build and/or matched to a geometry (e.g., "feature size") of this new build—into the build tray structure 150 and then install this tray assembly 104 onto the tray seat 130 of the base assembly 102, which repeatably locates the tray assembly 104 relative to the build window no and tensions the separation membrane 160 across the build window no to form a flat, repeatable surface offset and above the upper surface of the build window 110. Therefore, when the tray assembly 104 and the base assembly 102 are assembled, the build window 110 defines a reference plane (coincident with a focal play of the projection system 120) located relative to the build platform 106 and covered by a thin, flexible, transparent, separation membrane 160, which may both exhibit less adhesion to resin chemistries than the build window 110 and which may be deformed (e.g., inflated) to separate the separation membrane 160 from a layer of cured resin. Furthermore, the tray assembly 104 can define an interior volume configured to contain a curable resin, with a base of this interior volume formed by the separation membrane 160; the tray assembly 104 can therefore further function to contain a volume of resin and to isolate this resin from the build window 110 and the projection system 120 below, thereby simplifying both cleanup of the system 100 after a build and switching between separation membranes 160 configured specifically for particular resin chemistries between builds.

Thus, the system 100 can execute Blocks of the method S100 described below: to selectively photocure volumes of resin proximal to the separation membrane 160 via the projection system 120; to drive fluid between the separation membrane 160 and the build window no via the pressure regulation system 190, thereby exerting distributed upward force on the build and alleviating adhesion forces (e.g., Stefan adhesion and suction forces) between the separation membrane 160 and the build window 110; to vertically retract the build platform 106 to separate the separation membrane 160 from the build window no, to peel the separation membrane 160 from the newly cured layer of the build, and to make space to photocure a successive layer of resin; to relaminate the separation membrane 160 against the build window no; and to actuate the build platform 106 to a new position prior to photocuring a successive layer. Thus, the system 100 can execute the method S100 to reduce separation forces on a build and expand options for curable resin chemistries with minimal actuation of mechanical components, thereby increasing build speed, reducing system wear, and increasing repeatability across individual resin layers and across individual builds, when compared to existing additive manufacturing systems.

2.1 Applications: Layer Separation

The build window 110 defines a repeatable reference surface while the separation membrane 160: buffers photocured resin from the build window 110; defines a layer of consistent thickness over the reference surface of the build window 110 when laminated against the build window 110 to enable tight, repeatable control over thicknesses of layers of a build constructed within the system 100; and can be inflated in concert with retraction of the build platform 106 in order to apply a (distributed) force to a layer of cured resin above and thus overcome adhesion forces between the separation membrane 160, the build window no, and the newly cured layer of the build to separate the newly cured layer from the build window no in preparation for fabricating of a subsequent layer. In particular, the separation membrane 160 can "peel" away from an adjacent photocured layer of the resin as the system 100 pumps fluid between the separation membrane 160 and the build window no and as the system 100 retracts the build platform 106 from the window (e.g., normal to the reference surface), thereby limiting forces applied to the build when separating each layer from the build window no during this build cycle.

2.2 Applications: Separation Membrane Selection

Furthermore, the separation membrane 160 can be replaceable in the tray assembly 104 such that a user may select a separation membrane 160 of a particular thickness and/or composition for a next build cycle based on a geometry of the planned build, a known target green strength of the photocured resin selected for this build, and/or the chemistry of this selected resin. In one example, the system 100 is configured to manufacture a build defining small (e.g., "delicate") features and/or high-aspect-ratio features (e.g., tall and narrow features) by loading the tray assembly 104 with a relatively thin separation membrane 160. In another example, a user loads an oxygen-impermeable separation membrane 160 into the tray assembly 104 to configure the system 100 to construct a build with an oxygen-sensitive resin chemistry.

In one implementation, the tray assembly 104 can include an upper member 155 and a lower member 156 configured to automatically tension a separation membrane 160 when closed around the separation membrane 160, thereby enabling a user to rapidly exchange separation membranes 160 within the tray assembly 104 with few or no tools (e.g., a screw driver or hex wrench only), such as to reconfigure the tray assembly 104 for different build geometries or resin chemistries or to replace a worn separation membrane 160 (e.g., a cloudy, permanently-deformed, or contaminated separation membrane 160).

The system 100 can also include an interchangeable tray assembly 104, which can be replaced with tray assemblies of different sizes, shapes, or configurations (e.g., containing membranes of different types and thicknesses). For example, a user may select a tray assembly 104 corresponding to the size of the build to be manufactured by the system 100. Each of these tray assemblies 104 can be configured to kinematically align with the base assembly 102 (e.g., via magnets, mechanical fasteners, and/or reference features 134) to provide a repeatable position of the tray assembly and a repeatable tension on the separation membrane 160.

The system 100 also includes a system 100 of rubber or rubberized plastic gaskets arranged at contact points of the separation membrane 160 against the tray assembly 104 and/or the window platform 132 when the tray assembly 104 is engaged with the base assembly 102. For example, the tray assembly 104 can include a set of gaskets around each of the tensioning posts 159 tensioning separation membrane 160 between the upper member 155 and lower member 156 of the tray assembly 104, which may distribute the shear force on the separation membrane 160 over a larger area to prevent lateral movement or tearing of the separation membrane 160 when the separation membrane 160 is under tension. Additionally, the system 100 can include a resin-sealing gasket 164 that prevents resin ingress between the build tray and the separation membrane 160.

Furthermore, the system 100 can include a gasket configuration that seals off the interstitial region between the tensioned separation membrane 160 and build window no such that the pressure regulation system 190 can drive fluid into this interstitial region via the fluid distribution channel 142. For example, in a passive lamination gasket variation, the base assembly 102 can include a gasket along the edge of the window platform 132 circumscribing the build window no, thereby creating a seal between the tensioned separation membrane 160 and the gasket. Alternatively, in this passive lamination gasket variation, the base assembly 102 can exclude a gasket around the edge of the window platform 132 and instead the tray assembly 104 and attached separation membrane 160 are configured to form a seal against the window platform 132 directly. In an active lamination gasket configuration, the system 100 can include a gasket between the tray seat 130 and the lower surface of the tray structure 150 circumscribing the base of the window platform 132, thereby creating a seal between the tray assembly 104 and the tray seat 130 and/or the base of the window platform 132. However, the system 100 can execute variations of Blocks S120, S130, and S140 while separating a subsequent layer of the build when compared to the separation of the previous layer.

3. Hardware

As shown in FIG. 1A, the system 100 includes two subassemblies of electromechanical components that, when engaged in an engaged configuration, can execute a "bottom-up" DLP process. Generally, the system 100 includes a base assembly 102 and a tray assembly 104. A user may: assemble the tray assembly 104 by inserting a separation membrane 160 into the tray structure 150; and engage the tray assembly 104 with the base assembly 102 before the system 100 executes the method S100. The system 100 can then execute the method S100 via an imbedded computational device running computer code (hereinafter the "controller"), which electronically actuates the build platform 106 (e.g., via a linear actuation system) and controls the projection system 120 and the pressure regulation system 190 to selectively cure volumes of resin and to separate these cured volumes of resin from the build window no and separation membrane 160.

The system 100, in executing Blocks of the method S100, proceeds through multiple physical arrangements of the components in order to cure a build (e.g., a set of physical, 3D objects) from the resin contained within the tray assembly 104. In a lamination phase, the system 100 reduces the pressure (i.e. draws a vacuum/evacuates fluid from) in the interstitial layer between the separation membrane 160 and the build window 110, thereby fully laminating the separation membrane 160 against the build window 110 and preventing formation of bubbles or wrinkles that may disrupt the reference surface for the system 100. During the lamination phase, the system 100 can execute Block S110 of the method in order to photocure a selective volume of resin above the laminated surface of the separation membrane 160. Subsequent to completion of Block S110, the system 100 can execute a separation process including a pressurization phase, a retraction phase, and a relamination phase, corresponding to Blocks S120, S130, and S140 respectively. In the pressurization phase the system 100 injects fluid into the interstitial region, thereby generating separation between the separation membrane 160 and the build window 110 in order to reduce adhesion forces (e.g., Stefan adhesion, suction forces) between the newly cured layer of the build and the build window 110. In the retraction phase, the system 100 actuates the build platform 106 upward and away from the build window 110: to separate the separation membrane 160 from the build window 110; to peel the separation membrane 160 from the newly cured layer of the build; and to make space to photocure a successive layer of resin. In the relamination phase, the system 100 evacuates fluid from the interstitial region in order to peel the separation membrane 160 from the newly cured layer of the build and to relaminate the separation membrane 160 against the build window no in preparation for curing a successive layer of the build. Thus, the system 100 can repeat this process cycle to cure successive layers of the resin, thereby constructing a three-dimensional build.

3.1 Base Assembly

The system 100 includes a base assembly 102, which acts as the primary assembly resembling a 3D printer. The base assembly 102 includes a projection system 120, a window platform 132, a build window no, a fluid distribution port 140 and/or a fluid distribution channel 142, a gasket system, a pressure regulation system 190, a tray seat 130, a build platform 106, and a controller. The base assembly 102 can be a free-standing structure that may be placed on a level surface for best printing results. The free-standing structure of the base assembly 102 links the aforementioned components in a calibrated arrangement that ensures consistent alignment between the projection system 120 and the build window no and parallelism between the reference plane of the build window 110, the surface of the retractable build platform 106, and the focal plane(s) of the projection system 120. The structure of the base assembly 102 can be manufactured from any rigid material that does not significantly deform under the weight of the base assembly 102 or the stresses involved during repetitive build cycles.

The base assembly 102 can also include a build chamber, into which the tray assembly 104 may be loaded (e.g., via engagement with the tray seat 130), and a hatch to provide access to this build chamber. The base assembly 102 can further include systems configured to control the environment within the build chamber (e.g., such as an auxiliary pressure regulation system 190 and/or a set of heating elements).

3.1.1 Projection System

The projection system 120 is upward facing, is housed in the base assembly 102, and can include one or more projectors configured to project electromagnetic radiation in an emissive spectrum, which can include the ultraviolet (hereinafter "UV"), visible, or near infrared (hereinafter "NIR") spectrum. The projection system can emit electromagnetic radiation in one or more wavelength bands tuned to the chemical and physical properties of the resin and its specific curing process. For example, the projection system 120 (e.g., a digital UV projector) can project electromagnetic radiation in an emissive spectrum of 300-nanometer to 450-nanometers. The projection system 120 is electrically coupled to the controller; receives potentially software-modified frames corresponding to full or partial cross-sections of a three-dimensional model of the build; and projects electromagnetic radiation through the build window 110 and separation membrane 160 in the engaged configuration (and during the photocuring phase) to selectively photocure volumes of the resin according to build settings and the received frames.

In one variation, the system 100 can include a projection system 120, which further includes a set of light sources, such as projectors or other electromagnetic emitting devices. In this variation, each irradiation source of the projection system 120 can define a projective area within the build window 110 in order to maintain a higher resolution across the build window no via tiling or stitching techniques. Additionally or alternatively, each light source can define a separate emissive spectrum enabling the projection system 120 to project electromagnetic radiation within multiple combinations of spectral bands.

In one variation, the projection system 120 includes a UV or near-UV laser and scans (e.g., as a raster) a laser beam across the build window no according to frames received from the controller in order to selectively photocure a volume of resin located over the separation membrane 160.

3.1.2 Window Platform

Generally, the window platform 132 extends upwards from a tray seat 130 of the base assembly 102 and is configured to align within a tray aperture 152 of the tray assembly 104 when the system 100 is in the engaged configuration. The window platform 132 is a rigid structure that encompasses the projection system 120 and defines an opening above the upward facing projection system 120 that is spanned by the build window 110. The upper surface of the window platform 132 defines a horizontal reference plane which is coincident with the upper surface of the build window 110 and the primary focal plane of the projection system 120. The system 100 can include a window platform 132 of a shape that: corresponds to a shape of a tray aperture 152; enables engagement with the separation membrane 160; and is configured to define fluid distribution ports 140 and/or fluid distribution channels 142 around the build window 110 and within the interstitial region. For example, the upper surface of the window platform 132 can define a circular shape, a rectangular shape, or any other shape depending on the desired shape of the tray aperture 152. In an additional example, the system 100 can include a window platform 132 of any size larger than the build region of the system 100 and/or the dimensions of builds to be manufactured by the system 100. The system 100 can include a window platform 132 with filleted corners and edges around the upper surface of the window platform 132 to prevent tearing of the separation membrane 160 as it is tensioned over the window platform 132.

The window platform 132 defines an opening that is spanned or partially spanned by the build window no. Generally, the shape and size of the opening defined by the window platform 132 roughly corresponds with the shape and size of the upper surface of the build window no in order to maximize utilization of the build region of the system 100.

3.1.3 Build Window

The build window no is mounted to the window platform 132 such that the upper surface of the build window 110 is approximately flush with the upper surface of the window platform 132 and further defines the horizontal reference plane for builds manufactured in the system 100. The build window 110 is arranged above the projection system 120 and aligned with the projection area of the projection system 120 such that the focal plane of the projection system 120 coincides with the upper surface of the separation membrane 160 laminated over the build window 110. Generally, the build window 110 is substantially transparent (e.g., exhibiting greater than 85% transmittance) to the emissive spectrum of the projection system and thus passes electromagnetic radiation output by the projection system 120 into the resin above the build window no and separation membrane 160. The build window no also functions as a rigid support and reference surface for the separation membrane 160 and a layer of resin arranged thereover. The build window no is statically mounted to a base assembly 102, via the window platform 132, that can include the projection system 120, the build platform 106, the fluid distribution port 140, the pressure regulation system 190, and/or the build chamber to ensure repeatable, accurate alignment between the build window no and the rest of the base assembly 102. The interface between the rigid window platform 132 and the build window no is also gas-impermeable such that a pressure gradient, such as 300 kilopascals, can be sustained across the build window no.

The base assembly 102 can include a build window no manufactured from a pane of transparent, rigid glass, such as amorphous/silicate or crystalline/ceramic glass. In particular, the build window no can be both transparent to ultraviolet (or other) light output by the projection system 120 and can be substantially rigid, hard, and temperature-stable to form a robust, flat reference surface that supports the separation membrane 160 and that may exhibit minimal deflection or deformation during multiple build cycles, thereby yielding high and consistent build quality.

In one variation, the base assembly 102 can include a build window no that is transmissive to infrared (hereinafter "IR") radiation such that a thermographic sensor positioned below the build window no can accurately calculate the temperature of the resin during a during the photocuring phase of the build cycle.

3.1.4 Fluid Distribution Ports

The base assembly 102 includes one or more fluid distribution ports 140 configured to fluidically (i.e. pneumatically or hydraulically) couple the pressure regulation system 190 to the interstitial region between the separation membrane 160 and the build window 110, thereby enabling the pressure regulation system 190 to inject and/or evacuate fluid from the interstitial region while the system 100 is in the engaged configuration. The fluid distribution ports 140 can therefore be located within a gasket system that forms a seal between the base assembly 102 and the tray assembly 104 and, more specifically, between the build window 110 and the separation membrane 160. Each fluid distribution port 140 can define an opening that is fluidically coupled to the pressure distribution system 100 to enable the system 100 to adjust the pressure within the interstitial region via the pressure distribution port by injecting and/or evacuating fluid from the fluid distribution ports 140. In one implementation, the system 100 includes an inlet fluid distribution port 140 and an outlet fluid distribution port 140, which provides an inlet for fluid entering the interstitial region and an outlet for fluid evacuating from the interstitial region respectively. Alternatively, the base assembly 102 includes a single fluid distribution port 140, which is configured with the pressure regulation system 190 as both an outlet and an inlet for fluid in the interstitial region. In another implementation, the base assembly 102 can include additional fluid distribution ports 140 arranged throughout the interstitial region in order to reduce asymmetrical fluid flow from one side of the interstitial region to another.

3.1.5 Fluid Distribution Channel

In one variation, the base assembly 102 includes a fluid distribution channel 142 intersecting the fluid distribution ports 140 and configured to distribute fluid evenly throughout the interstitial region. More specifically, the base assembly 102 can include a fluid distribution channel 142 configured to reduce asymmetrical fluid flow relative to the build window 110 and the separation membrane 160 by distributing fluid from a fluid distribution port 140 throughout the interstitial region. Thus, when fluid is injected into or evacuated from the interstitial region, the entire region is pressurized and/or depressurized substantially simultaneously, thereby preventing bubble formation in the separation membrane 160 or uneven separation of the separation membrane 160 from the build during the retraction and/or relamination phase.

In one implementation, the fluid distribution channel 142 is integrated within the window platform 132 supporting the build window 110 and defines a channel inset into the upper surface of the rigid window platform 132. In this implementation, the fluid distribution channel 142 is arranged circumferentially around the perimeter of the build window no and intersects an inlet fluid distribution port 140 and an outlet fluid distribution port 140 fluidly coupled to the pressure regulation system 190. Thus, the base assembly 102 can include a fluid distribution channel 142 circumscribing the build window no and configured to distribute fluid evenly in the interstitial region.

However, the base assembly 102 can include a fluid distribution channel 142 defining any path throughout the interstitial region that reduces asymmetrical fluid flow within the interstitial region.

3.1.6 Pressure Regulation System and Pressure Chambers

Generally, as shown in FIG. 7, the base assembly 102 can include a pressure regulation system 190 configured to pressurize and/or depressurize by injecting and/or evacuating fluid from the interstitial region in accordance with the method S100. More specifically, the base assembly 102 can include a pressure regulation system 190 that is: fluidically coupled to the fluid distribution port 140; configured to inject fluid into the interstitial region to separate the separation membrane 160 from the build window 110 in the engaged configuration and during a pressurization phase; and configured to evacuate fluid from the interstitial region to laminate the separation membrane 160 to the build window no in the engaged configuration and during a lamination phase.

The pressure regulation system 190 can include a pump (e.g., a diaphragm pump) and a set of electromechanical valves connected by a set of tubes to the fluid distribution ports 140. More specifically, the pressure regulation system 190 can include a pump fluidically coupled to a set of two electromechanical valves configured to actuate in response to commands from the system 100 and direct fluid flow through the pump into the interstitial region or out of the interstitial region based on a current phase of the build cycle.

In one implementation, the pressure regulation system 190 includes a set of electronically actuated valves configured to regulate flow between a compressed fluid supply line (e.g., a compressed air supply line in the building housing the system) and a central vacuum line. The system 100 can, therefore, be connected—such as via external ports—to the compressed fluid supply line and the central vacuum line.

In another implementation, the pressure regulation system 190 includes a compressor system 100 (e.g., a centrifugal compressor) and an external air port and is configured to: intake ambient air via the external air port; compress this ambient air; and inject this ambient air into the interstitial region. The pressure regulation system 190 can also evacuate air from the interstitial region via the compressor and the external air port by running the compressor system 100 in reverse. Alternatively, the pressure regulation system 190 is fluidly coupled to a fluid reservoir (e.g., a tank containing an inert fluid). Thus, the system 100 can inject fluid from the fluid reservoir into the interstitial region or evacuate this fluid into the fluid reservoir via the pressure regulation system 190.

In yet another implementation, the base assembly 102 can include a compressor system 100 and/or a system 100 of electronically actuated valves configured to draw fluid from the pressurized build chamber (e.g., above the surface of the resin reservoir contained in the build tray) in order to pressurize the interstitial region in the pressurization phase. Likewise, the system 100 can evacuate fluid from the interstitial region back into the build chamber during the relamination phase and/or the lamination phase. Thus, in this implementation, the system 100 can operate independently from external sources of a working fluid for pressurization or depressurization of the interstitial region.

Additionally or alternatively, the base assembly 102 can include a second pressure regulation system 190 configured to control the pressure of the build chamber independent from the pressure of the interstitial region. The system 100 can coordinate the first pressure regulation system 190 and the second pressure regulation system 190 to improve separation (e.g., reduce separation forces and increase separation speed) of the separation membrane 160 from the cured resin layer of the build.

The pressure regulation system 190 can maintain a maximum operating inflation differential pressure up to or exceeding 300 kilopascals and can pull a vacuum (e.g., a maximum operating deflation pressure) greater than 200 kilopascals. These pressures are sufficient to adequately separate the separation membrane 160 from the build window 110 in the pressurization phase and to laminate the separation membrane 160 to the build window 110 in the lamination and/or the lamination phase. However, the pressure regulation system 190 can maintain alternative operating differential pressures based on the volume of the interstitial region and the force exerted on the interstitial region by the separation membrane 160 due to the particular elasticity and thickness of the separation membrane 160.

Additionally, the pressure regulation system 190 can include resin traps and can be configured to purge these resin traps (via the actuation of purge valves) to remove resin from these resin traps when the pressure regulation system 190 is accidentally contaminated with resin (e.g., due to spillage from the resin reservoir during engagement or failure of the separation membrane 160 due to excessive wear). Alternatively, the pressure regulation system 190 can purge resin from the fluid distribution ports 140 by pumping fluid out of the fluid distribution ports 140 while the base assembly 102 is disengaged from the tray assembly 104.

3.1.7 Gas-Permeable Layer

Generally, as shown in FIG. 6, the base assembly 102 can include an intermediate gas-permeable layer 180 arranged over the surface of the build window 110 and between the build window no and the separation membrane 160 when the system 100 is in the engaged configuration. More specifically, the base assembly 102 can include a gas-permeable layer 180 that is: substantially transparent to electromagnetic radiation within the photo-initiating range; arranged over the upper surface of the build window 110; and configured to maintain a minimum interstitial volume within the interstitial region between the build window 110 and the separation membrane 160 in the engaged configuration. Thus, by maintaining space between the separation membrane 160 and the build window no in the engaged configuration, the gas-permeable layer 180 reduces the incidence of bubbles between the separation membrane 160 and the build window 110 during the lamination phase of the build cycle. Additionally, inclusion of the gas-permeable layer 180 can reduce or eliminate suction forces between the separation membrane 160 and the build window no.

In one implementation, the base assembly 102 includes a gas-permeable layer 180 that defines a gas-permeable grid or lattice structure over the build window no. In this implementation, the gas-permeable layer 180 can be manufactured from a material that is substantially transparent (e.g., greater than 85% transmittance) and characterized by the similar index of refraction as the build window no in order to reduce aberrations in the projection incident with the resin opposite the separation membrane 160 during the photocuring process.

3.1.8 Tray Seat

The base assembly 102 can define a tray seat 130 around the base of the window platform 132 with a surface offset below the upper surface of the window platform 132 such that the window platform 132 protrudes upwards from the center of the tray seat 130. The tray seat 130 defines a surface with a high degree of parallelism with the reference plane defined by the window platform 132. Additionally, the vertical offset between the tray seat 130 and the reference plane can be calibrated and/or constructed with a low tolerance such that, when the tray assembly 104 is seated at the tray seat 130 of the base assembly 102 in the engaged configuration, the separation membrane 160 is precisely positioned relative to the build window 110. In one variation, the system 100 includes a tray seat 130 and tray assembly 104 tolerance stack that positions the separation membrane 160 slightly above (e.g., less than 1 millimeter above) the build window 110 when there is no pressure gradient across the separation membrane 160. In another variation, the system 100 defines a tray seat 130 and tray assembly 104 tolerance stack that positions the upper surface of the window platform 132 and/or build window 110 such that these surfaces protrude into the tensioned separation membrane 160 while the system 100 is in the engaged configuration, thereby automatically laminating the separation membrane 160 against the build window 110.

The tray assembly 104 can define a set of registration features 154 corresponding to complimentary reference features 134 arranged on the tray seat 130 of the base assembly 102. Therefore, in the engaged configuration, the registration features 154 can constrain the tray assembly 104 relative to the base assembly 102. In one implementation, the reference features 134 of the base assembly 102 and the registration features 154 of the tray assembly 104 are configured to kinematically align the tray assembly 104 relative to the base assembly, thereby maintaining a precise offset between the separation membrane 160 and the build window no and/or preventing movement of the tray assembly 104 relative to the base assembly 102 during the build cycle. In another implementation, the base assembly 102 can include imbedded magnetic features underneath the tray seat 130 in order to bias the tray assembly 104 downward onto the reference features 134 of the tray seat 130. Alternatively, the base assembly 102 can include a set of mechanical clamps or screws in order to seat the tray assembly 104 at the tray seat 130 of the base assembly 102.

3.1.9 Reference Features

Generally, the reference features 134 defined by the tray seat 130 are configured to correspond to matching features in the tray assembly 104 and to thus align the tray assembly 104 with the base assembly 102. More specifically, the base assembly 102 can define positive reference features 134 or negative reference features 134 on the tray seat 130. Alternatively, the base assembly 102 can include reference features 134 that are separate components configured to install onto the tray seat 130. In combination with a biasing force, such as a magnetic force between corresponding magnetic features in the base assembly 102 and tray assembly 104, mechanically applied force securing the tray assembly 104 to the base assembly 102, and/or the force of gravity pulling the tray assembly 104 downward onto the base assembly 102, the reference features 134 kinematically constrain the tray assembly 104 relative to the base assembly 102 in all six degrees-of-freedom. Thus, corresponding reference features 134 defined in the tray seat 130 and in the tray assembly 104 can repeatably and accurately align the tray assembly 104 with the base assembly 102 when the tray assembly 104 is engaged with the base assembly 102.

3.1.10 Magnetic Locking Mechanism

Generally, the system 100 can include a set of magnets imbedded within the base assembly 102 below the tray seat 130 and a corresponding magnetic material (e.g., a ferromagnetic substance) imbedded within the tray assembly 104, thereby biasing the tray assembly 104 toward the tray seat 130. More specifically, the base assembly 102 can include a magnetic lock arranged within the tray seat 130; and the tray assembly 104 can include a magnetic registration feature 154 configured to magnetically engage with the magnetic lock in the engaged configuration.

In one implementation, the base assembly 102 can include an electromagnetic lock as the magnetic lock such that the system 100 can actively engage and/or disengage the tray assembly 104 from the base assembly 102 via an electrical current. Thus, the base assembly 102 can include an electromagnetic lock configured to: magnetically engage with the magnetic registration feature 154 in the engaged configuration; and magnetically disengage with the magnetic registration feature 154 in a disengaged configuration.

3.1.11 Build Platform

Generally, the base assembly 102 also includes a vertically mobile build platform 106 to which a first layer of the build adheres and from which the build is suspended toward the build window no during the build cycle. More specifically, the base assembly 102 can include a build platform 106 defining a planar surface opposite and substantially parallel to the upper surface of the build window no; and a linear actuation system (including a single linear actuation system or multiple timed linear actuation systems) configured to vertically translate the build platform 106 relative to the build window no. In one implementation, the system 100 can include a build platform 106 defining negative features, such as channels or through holes to improve the flow of resin out from under the build platform 106 during advancement of the build platform 106 into the resin reservoir and to facilitate the removal of the build from the build platform 106 after completion of the build.

The build platform 106 is a vertically actuating surface opposite the build window 110. The system 100 can include a linear actuation system (with increments as small as 0.1 microns) mechanically coupled to the build platform 106. Additionally, during actuation of the linear actuation system, the controller: can track forces applied by the linear actuation system to the build platform 106 (e.g., based on a current draw of the linear actuation system or by sampling a force sensor or strain gauge coupled to the build platform 106); and implement closed-loop techniques to control movement of the linear actuation system in order to achieve a particular distribution of separation forces between the newly cured layer of the build and the separation membrane 160 (e.g., to sweep this separation force along a predefined force profile once per layer). Thus, during the build cycle the linear actuation system lowers the build platform 106 to specific heights above the separation membrane 160 such that photocured resin adheres to the build surface of the build platform 106 facing the window. As the system 100 selectively cures successive layers of the build according to Blocks of the method S100, the system 100 can retract the build platform 106 upward by a first distance in order to separate the current layer of the build from the separation membrane 160 and then advance the build platform 106 downward—by a second distance less than or equal to the first distance—in preparation for curing a successive layer of the build.

3.1.12 Controller

The base assembly 102 of the system 100 can include a controller that controls the electromechanical components of the system 100. Generally, the controller is an imbedded computer system that sends instructions to the projection system 120, the pressure regulation system 190, and the linear actuation system coupled to the build platform 106, to execute the method S100. In one implementation, the controller controls and receives instructions from a user interface, which can be a touchscreen or a set of buttons, switches, nobs, etc. Alternatively, the controller can communicate with and receive instructions from an external computational device. In another implementation, the controller is connected to a network, such as the internet, and is configured to receive instructions over the network. Additionally, the controller can send commands, in the form of digital and/or analog electrical signals, in order to actuate various electromechanical components of the system such as the magnetic locking mechanism, a door hatch release to the build chamber, the purge valves, and/or lighting elements within the build chamber. Furthermore, the controller can receive data from sensors integrated with the system 100 and execute feedback control algorithms based on these data in order to modify the function of the projection system 120, the pressure regulation system 190, and/or the linear actuation system.

3.2 Tray Assembly

As shown in FIG. 1B, the system 100 includes a tray assembly 104 (i.e. a build tray) which further includes: a tray structure 150 (which can define an upper member 155 and a lower member 156), a separation membrane 160, a set of tensioning gaskets 162, and/or a resin-sealing gasket 164. The tray assembly 104 is configured to engage (e.g., kinematically mount to) the base assembly 102 over the window platform 132 via corresponding registration features 154 arranged on the underside of the tray structure 150 and reference features 134 on the tray seat 130. Generally, the tray assembly 104 contains the resin reservoir during a build cycle and positions and maintains the tension in the separation membrane 160 over the window platform 132, build window 110, and/or fluid distribution ports 140. More specifically, the tray assembly 104 can include a tray structure 150 that defines an upper member 155 and a lower member 156, which are fastened together via a set of fasteners with the separation membrane 160 in between the upper member 155 and the lower member 156. Thus, the tray structure 150 functions to position the separation membrane 160 so that it is configured to: laminate across the upper surface of the build window no in response to an evacuation of fluid, via the fluid distribution port 140, from an interstitial region between the base assembly 102 and the tray assembly 104 in the engaged configuration; and configured to separate from the build window 110 in response to injection of fluid, via the fluid distribution port 140, into the interstitial region.

In one implementation, the base assembly 102 includes a sealed build chamber that encloses the tray assembly 104 and sealed. Additionally, the build chamber can be filled with an inert fluid, such as to enable use of reactive (e.g., reactive with oxygen) resin chemistries in the system 100. In one implementation, the build chamber is integrated with the upper member 155 of the tray structure 150. In this implementation, the resin can be injected into the inner volume of the assembly including the build tray and the build chamber via an injection port such that the resin is not exposed to the atmosphere at any point while being loaded into the tray assembly 104.

3.2.1 Tray Structure

Generally, the tray structure 150: defines a tray aperture 152 spanned by the separation membrane 160 and circumscribing the build window 110; defines registration features 154 configured to engage with the reference features 134 of the tray seat 130; and defines an interior volume for containing the resin reservoir. The tray structure 150 can be constructed from a rigid, non-reactive, temperature stable solid material, such as aluminum or another metal or metal alloy. In one implementation, the tray structure 150 is constructed from milled aluminum. Additionally, the tray assembly 104 can be a member of a set of tray assemblies associated with the system 100, each tray assembly 104 in the set of tray assemblies including a tray structure 150 of a different shape or size in order to accommodate a wider variety of build sizes and shapes. In one implementation, the tray structure 150 includes an upper member 155 and a lower member 156 configured to fasten to each other via a set of fasteners. Thus, during assembly of the tray assembly, a user may arrange the separation membrane 160 between the lower member 156 and the upper member 155, thereby repeatably locating the separation membrane 160 relative to the tray seat 130 in the engaged configuration.

Generally, the upper member 155 of the build tray defines the volume occupied by the resin during the build cycle and the region within which the system 100 can selectively photocure this resin into the build via execution of a series of build cycles. The upper member 155 also defines a tray aperture 152 that corresponds to the window platform 132 such that the upper member 155 can be lowered over the window platform 132 of the base assembly 102. The tray aperture 152 in the upper member 155 is spanned by the separation membrane 160 thereby enclosing the volume defined by the upper member 155 from the bottom. Thus, the tray assembly 104 when fully assembled defines an interior volume above the separation membrane 160 tensioned across the tray aperture 152, the interior volume configured to contain a reservoir of resin.

In one implementation, an inner surface of the build region is rounded to reduce stress concentrations in the separation membrane 160. In one implementation, the upper member 155 of the build tray defines a rounded rectangular build region. Additionally, the upper member 155 can define an inner surface that extends upward and perpendicular to the build window 110. The inner surface then expands upward and outward in a conical shape, wherein the vertical cross section of the conical inner surface has dimensions proportionally similar to the vertical cross-section of the perpendicular inner surface. Thus, the perpendicular and conical sections of the inner surface define a volume configured to contain the resin reservoir. However, the upper member 155 of the build tray can define any rounded internal volume. Additionally, the upper member 155 can include integrated heating and/or cooling elements. The system 100 can activate the heating and/or cooling elements to adjust the temperature of the resin within the build tray to near an optimal temperature for the photocuring reaction of the resin.

The lower member 156 defines a shape consistent with the inner surface of the upper member 155 and can define corresponding features to the reference features 134 in the tray seat 130 of the base assembly 102. In one implementation, the base assembly 102 and/or the lower member 156 contain magnets (i.e. magnetic registration features 154), which kinematically align the lower member 156, and therefore the tray assembly 104, to the base assembly 102 by biasing the lower member 156 against the reference features 134 in the base assembly 102. The lower member 156 also defines holes such that fasteners, such as screws or bolts, passing through the holes can insert into corresponding holes in the upper member 155. Alternatively, the system can include fasteners that are directly integrated with either the upper member 155 and/or the lower member 156 and the system can include an upper member 155 and a lower member 156 configured to slot directly into the opposite member of the tray structure 150.

3.2.2 Separation Membrane

The separation membrane 160 can include a transparent, thin, and flexible film or sheet characterized by low adhesion to photocuring resins. The separation membrane 160 is manufactured at sizes specific to particular tray assemblies 104 and with holes aligned with tensioning posts 159 extending from either the upper member 155 or the lower member 156 of the build tray. Thus, the separation membrane 160 is positioned between the upper member 155 and the lower member 156 of the build tray such that the tensioning posts 159 extend from one member of the tray structure 150, through a hole, slot, or perforation in the separation membrane 160, and the into corresponding negative features in the opposite member of the tray structure 150. Additionally or alternatively, the separation membrane 160 can define a set of holes and/or slots such that there is an interference fit between the separation membrane 160 and the set of tensioning posts 159, thereby preloading (i.e. automatically tensioning) the separation membrane 160 with a tensile stress.

Thus, the tray assembly 104 can include an upper member 155 and a lower member 156 with interlocking features and a separation membrane 160 perforated in an interference fit with these interlocking features. Therefore, the geometry of the tensioning posts 159 relative to the corresponding perforations in the separation membrane 160 functions to automatically tension the separation membrane 160 across the tray aperture 152 defined by the tray structure 150. For example, the upper member 155 of the tray structure 150 can define milled positive features including the tensioning posts 159 corresponding to milled negative features in the lower member 156 such that the negative features of the lower member 156 fit over the positive features of the upper member 155. In this example, the separation membrane 160 defines perforations corresponding to the positive features of the upper member 155 in an interference fit. In this implementation, the tray assembly 104 can further include separate fasteners—such as magnets, clasps, latches, and/or screws—to fasten the lower member 156 to the upper member 155.

However, the separation membrane 160 can be tensioned across the tray aperture 152 defined by the tray structure 150 in any other way (e.g., via direct bonding to the tray structure 150 or via another fastening configuration).

Thus, in one implementation, the tray assembly 104 can include: an upper member 155 defining a set of positive features including a set of tensioning posts 159; a lower member 156 defining a set of negative features configured to engage with the set of positive features; a separation membrane 160 arranged between the upper member 155 and the lower member 156 and defining a third set of perforations outwardly offset from the set of tensioning posts in an interference fit between the separation membrane 160 and the set of tensioning posts 159 tensioning the separation membrane 160 via the interference fit.

3.2.3 Separation Membrane Selection

As described above, the system 100 can include an interchangeable separation membrane 160. Therefore, a user may select different tray assemblies containing various separation membranes and tray structure configurations and/or install separation membranes of different types in one tray assembly 104 based on various factors, such as: the geometry (e.g., feature sizes) of a build queued for manufacture by the system 100; characteristics of the resin chemistry selected for the build and a corresponding photocuring process; the target green strength of the selected resin; and/or cumulative wear or degradation of the separation membrane 160. The separation membrane 160 is replaceable by removing the fasteners in the tray assembly 104 and separating the upper member 155 and the lower member 156 of the build tray from the separation membrane 160. After the separation membrane 160 is removed a new separation membrane 160 can be placed over the tensioning posts 159, thereby securing the new separation membrane 160 between the upper member 155 and the lower member 156 of the build tray.

Because the separation membrane 160 is exchangeable within the build tray, the system 100 can include multiple types of separation membranes with varying sizes, thicknesses, tensions, permeabilities, elasticities and/or materials, which may be selected by a user or specified by the system 100 based on the resin loaded into the interchangeable tray assembly 104. In one implementation, the separation membrane 160 is constructed from copolymerized tetrafluoroethylene (hereinafter "TFE") and has a thickness less than one millimeter, and low fluid permeability. Alternatively, the membrane is constructed from 2,2-bis(trifluoromethyl)-4,5-difluoro-1,3-dioxole (hereinafter "TFE-AF") and has high oxygen permeability such that a layer of the resin can be oxygenated.

In one implementation, the system 100 includes an oxygen-permeable separation membrane 160 to allow oxygen to saturate a layer above the separation membrane 160 within the resin. In resins with oxygen-inhibited chemistries, the oxygen saturated layer can therefore prevent the resin from photocuring against (and adhering to) the separation membrane 160 or the build window no to a certain depth beyond the separation membrane 160. In this implementation, the separation membrane 160 can be constructed from TFE-AF. Additionally, the system 100 can include a separation membrane 160 of a greater thickness and/or stiffness, an increased offset between the separation membrane 160 and the build window no, and/or execute a decreased peak inflation pressure during Block S120 (e.g., so that the separation can diffuse oxygen into the resin without substantially deflecting). In one implementation, the pressure applied to the interstitial region between the build window 110 and the separation membrane 160 is matched to the atmospheric pressure at the upper surface of the separation membrane 160 such that the pressure gradient across the separation membrane 160 is negligible.

When the system 100 is manufacturing a build with relatively delicate features, a thinner membrane (e.g., between 20 microns and 50 microns thick) can be inserted into the tray assembly 104. The thinner membrane may have greater elasticity and therefore may impart a smaller magnitude of force as it is pulled away from the layer features during each build cycle. However, thinner separation membranes 160 may wear more rapidly (e.g., over fewer build cycles) than thicker separation membranes and thus may require replacement at a higher frequency. Conversely, a thicker separation membrane 160 (e.g., up to 150 microns thick) may be loaded into the tray assembly 104 when builds defining more robust geometries are queued at the system 100, since a thicker separation membrane 160 may be more resistant to cumulative wear, may be replaced less often, and may withstand greater forces necessary to separate larger resin features from the build window 110. For example, a user may load a thin separation membrane 160 into the build tray when a resin with low green strength is selected for a next build in the system 100, since this thinner separation membrane 160 may apply lower forces to layers of this cured resin. However, the user may also load a thicker separation membrane 160 into the build tray when a resin with higher green strength is selected for a next build in the system 100, since this thicker separation membrane 160 may be more robust and/or may be inflated faster than a thin separation membrane 160, thereby enabling shorter separation periods between layers of the build. Thus, a first tray assembly 104 can include a first separation membrane 160 defining a first thickness between 50 and 200 microns and a second tray assembly 104 can include: the tray structure 150 of the first tray assembly 104; and a second separation membrane 160, defining a thickness less than 50 microns, tensioned across the tray aperture 152 defined by the tray structure 150, configured to configured to laminate across the upper surface of the build window 110 in response to an evacuation of fluid, via the fluid distribution port 140, from an interstitial region between the base assembly 102 and the tray assembly 104 in the engaged configuration, and configured to separate from the build window 110 in response to injection of fluid, via the fluid distribution port 140, into the interstitial region.

Additionally, the user may exchange separation membranes 160 according to the chemistry of the resin or the photocuring reaction of the resin in order to improve release characteristics of the resin. Although TFE is generally chemically stable, separation membranes 160 of alternative compositions can be included in the system 100 when manufacturing with an especially reactive resin composition or resins that exhibit especially exothermic photocuring reactions. In alternative implementations, tray assembly 104 can include a separation membrane 160 manufactured from semi-crystalline perfluoroalkoxy alkane (i.e. PFA) or fluorinated ethylene propylene (i.e. FEP). In one implementation, the separation membrane 160 is coated with a transparent super-hydrophobic nanocoating to prevent adhesion between the separation membrane 160 and the build in its green state.

Furthermore, the system 100 can be supplied with a set of separation membranes 160 characterized by different oxygen or gas permeabilities. For example, a separation membrane 160 of TFE or PFA may be relatively impermeable to oxygen (e.g., at thicknesses greater than 50 microns) and therefore may be loaded into the tray assembly 104 when the system 100 is photocuring an oxygen-sensitive resin such as a thiol resin or a polyolefin resin. Thus, the tray assembly 104 can include a separation membrane 160 manufactured from an oxygen-impermeable film. Because the system 100 can control the oxygen concentration in the resin reservoir (via an inert environment in the build chamber and an oxygen-impermeable membrane), the system 100 can photocure resins containing lower proportions of photoinitiator, thereby improving photocuring speed, cross-link density, and green strength of builds constructed from these resins.

Alternatively, the user may load a separation membrane 160 of TFE-AF into the build tray in order to intentionally create an oxygen rich region in the resin reservoir to inhibit photocuring of the resin proximal to the separation membrane 160, thereby further improving separation from the separation membrane 160 at the expense of limiting the variety of resin chemistries that are compatible with the separation membrane 160. Thus, the tray assembly 104 can include a separation membrane 160 manufactured from a gas-permeable film.

The tray assembly 104 can further include a separation membrane 160 characterized by a high heat deflection, continuous use, or glass transition temperature, thereby enabling the separation membrane 160 to resist higher reaction temperatures (e.g., up to 100 degrees Celsius) typical of certain resin chemistries. Thus, the tray assembly 104 can include a separation membrane 160: characterized by a heat deflection temperature greater than 100 degrees Celsius; and chemically inert to the resin at a temperature of less than 100 degrees Celsius. However, the system can include a separation membranes 160 characterized by heat deflection temperature less than the reaction temperature of the photocurable resin at the expense of an increased rate of wear.

3.2.4 Tensioning Gaskets

In one implementation, the upper member 155 and the lower member 156 include a set of rubber or rubberized plastic gaskets arranged around each tensioning post 159 to distribute tensile force applied to the separation membrane 160 over a larger area, thereby preventing excessive lateral movement/shifting or tearing of the separation membrane 160 while under tension. The tensioning gaskets 162 effectively sandwich the separation membrane 160 to bear the load of the tension in the membrane across the entire area of the gasket. In addition, the tray assembly 104 can include tensioning gaskets 120 configured to achieve a particular distribution (e.g., an even distribution) of tensile forces across the membrane and a particular inflationary profile or behavior of the separation membrane 160 (e.g., similar separation of the membrane independent of location within the build region). Thus, the tensioning gaskets 162 can be arranged on the bottom surface of the upper member 155 and/or the upper surface of the lower member 156 around the holes defined for the tensioning posts 159 in the upper member 155 and the lower member 156.

3.2.5 Resin-Sealing Gasket

The system 100 can also include a resin-sealing gasket 164 arranged along the edge of the tray aperture 152 of the upper member 155 of the build tray. Generally, the resin-sealing gasket 164 prevents resin ingress between the upper member 155 of the build tray and the separation membrane 160. Thus, when the tray assembly 104 is lowered over and around the window platform 132, the separation membrane 160 is tensioned and pulled upward by the window platform 132 protruding through the inner opening of the build tray spanned by the separation membrane 160. The separation membrane 160 is thus biased against the resin-sealing gasket 164 on the edge of the interior opening of the upper member 155 of the build tray creating a seal against resin held in the build tray. Additionally, the resin-sealing gasket 164 can prevent excess shear stress from tearing the separation membrane 160 when it comes into contact with the interior edge of the upper member 155 of the build tray.

In implementations where the separation membrane 160 is not pulled upward by a protruding window platform 132 in the engaged configuration (e.g., in implementations where the separation membrane 160 is positioned less than one millimeter above the build window 110 in the engaged configuration when there is no pressure gradient across the separation membrane 160), the tray assembly 104 can include a set of resin-sealing gaskets 164 circumscribing the tray aperture 152 in between the separation membrane 160 and the upper member 155 of the tray structure 150.

3.3 Inter-Assembly Gasket Configurations

Generally, the system 100 can define an inter-assembly gasket configuration in order to fluidically isolate (e.g., for a maximum operating pressure such as 300 kilopascals) the interstitial region from the build chamber and from external ambient environment in order to enable precise control of the pressure within the interstitial region via the pressure regulation system 190. Because the interstitial region is enclosed during engagement of the tray assembly 104 with the base assembly 102, the inter-assembly gasket configuration can include gaskets integrated with the tray assembly 104, the base assembly 102, and/or independent gasket components therebetween.

3.3.1 Active Lamination Gasket Variation

In an active lamination gasket variation, shown in FIGS. 4A and 4B, the system 100 includes a gasket integrated with the lower member 156 of the tray assembly 104 circumscribing the bottom edge of the tray aperture 152 defined by the lower member 156 of the tray assembly 104 and configured to seal (i.e. within the maximum operating pressure of the system) against the base of the window platform 132 and/or the tray seat 130 in the engaged configuration. Additionally, as shown in FIG. 4A, when the system 100 is in the engaged configuration and while there is no pressure gradient across the separation membrane 160, the separation membrane 160 is suspended by the tray structure 150 offset from (by greater than 50 microns) and parallel the surface of the build window 110. Thus, when the pressure regulation system 190 evacuates fluid from the interstitial region (and, therefore, induces a negative pressure gradient across the separation membrane 160) the separation membrane 160 laminates against the upper surface of the build window no as shown in FIG. 4B. More specifically, the system 100 can include an interface gasket 172: arranged between a lower surface of the tray structure 150 and a base of a window platform 132 supporting the build window no in the engaged configuration; circumscribing the tray aperture 152, the fluid distribution port 140, and the build window no in the engaged configuration; and configured to seal fluid within the interstitial region up to a maximum differential pressure greater than a maximum operating pressure. Additionally, in this implementation, the system 100 includes a tray assembly 104 which further includes the separation membrane 160 tensioned across the tray aperture 152 above and substantially parallel to the build window 110 in the engaged configuration.

In the active lamination gasket variant, the positioning of the separation membrane 160 offset (e.g., by greater than 50 microns) above the build window 110 reduces the incidence of bubble formation between the separation membrane 160 and the build window 110 during the relamination phase because, as the system 100 pulls a vacuum across the separation membrane 160 during the relamination phase, the volume of the interstitial region decreases pulling to separation membrane 160 toward the build window 110 from the center of the membrane. Therefore, the separation membrane 160 laminates against the build window 110 from the center outwards, thereby preventing bubble formation during this relamination.

Additionally, in this variation, the base assembly 102 can include one or more fluid distribution ports 140 that are arranged anywhere within the tray assembly 104 and the base assembly 102. In one implementation, the fluid distribution port 140 is arranged on the base of the window platform 132, thereby facilitating the even distribution of air around the window platform 132.

In one implementation, the tray assembly 104 can include a sealing gasket arranged between the lower member 156 of the tray structure 150 and the separation membrane 160 and circumscribing the tray aperture 152 defined by the lower member 156 in order to prevent egress of fluid from the interstitial region during the pressurization phase of the build cycle.

3.3.2 Passive Lamination Gasket Variation

In a passive lamination gasket variation, shown in FIGS. 5A and 5B, the system 100 includes an interstitial gasket 170 circumscribing the edge of the window platform 132, which is configured to protrude through the tray aperture 152 defined by the tray assembly 104 such that the separation membrane 160 is tensioned over the surface of the window platform 132 and creates a seal with the interstitial gasket 170 in the engaged configuration. Therefore, in this variation, the system 100 defines an interstitial region that includes only the volume of fluid between the separation membrane 160 and the build window no (as opposed to also including fluid between the tray assembly 104 and the base assembly 102). Additionally, in this variation, the system 100 can include a fluid distribution port 140 arranged on the surface of the window platform 132 proximal to the build window no, thereby enabling the pressure regulation system 190 to inject and/or evacuate fluid from this more localized interstitial region, as shown in FIG. 5B. As shown in FIG. 5A, the separation membrane 160 is laminated across the build window no without a negative pressure gradient between the interstitial region and the build chamber. Alternatively, in this variation, the system 100 can include a fluid distribution port 140 inset into the window platform proximal to a raised build window defining an upper surface coincident with the edge of the window.

More specifically, the base assembly 102 can include the build window no configured to protrude through the tray aperture 152 against the separation membrane 160 in the engaged configuration. Additionally, the base assembly 102 can include an interstitial gasket 170: circumscribing the fluid distribution port 140 and the build window no; configured to contact the separation membrane 160 in the engaged configuration; and configured to seal fluid within the interstitial region up to a maximum differential pressure greater than a maximum operating pressure.

The interstitial gasket 170 can be manufactured from rubber or rubberized plastic that can form a seal with the tensioned separation membrane 160. Like the upper surface of the build window 110, the upper surface of the interstitial gasket 170 is flush with the upper surface of the window platform 132 and is coincident with the horizontal reference plane defined by the window platform 132. In one implementation, the interstitial gasket 170 can form a seal with the tensioned separation membrane 160, when the tray assembly 104 is engaged with the base assembly 102, that can withstand a pressure gradient of 300 kilopascals.

In one implementation of this passive lamination variation, the system 100 can include a window platform 132, which is configured to protrude through the tray aperture 152 defined by the tray assembly 104 such that the separation membrane 160 is tensioned over the surface of the window platform 132 and creates a seal directly with the edge of the window platform 132 in the engaged configuration. This implementation obviates the need for the interstitial gasket 170 on the edge by creating a direct seal against the material of the window platform 132.

4. Engagement and Initialization

Figure 3B:
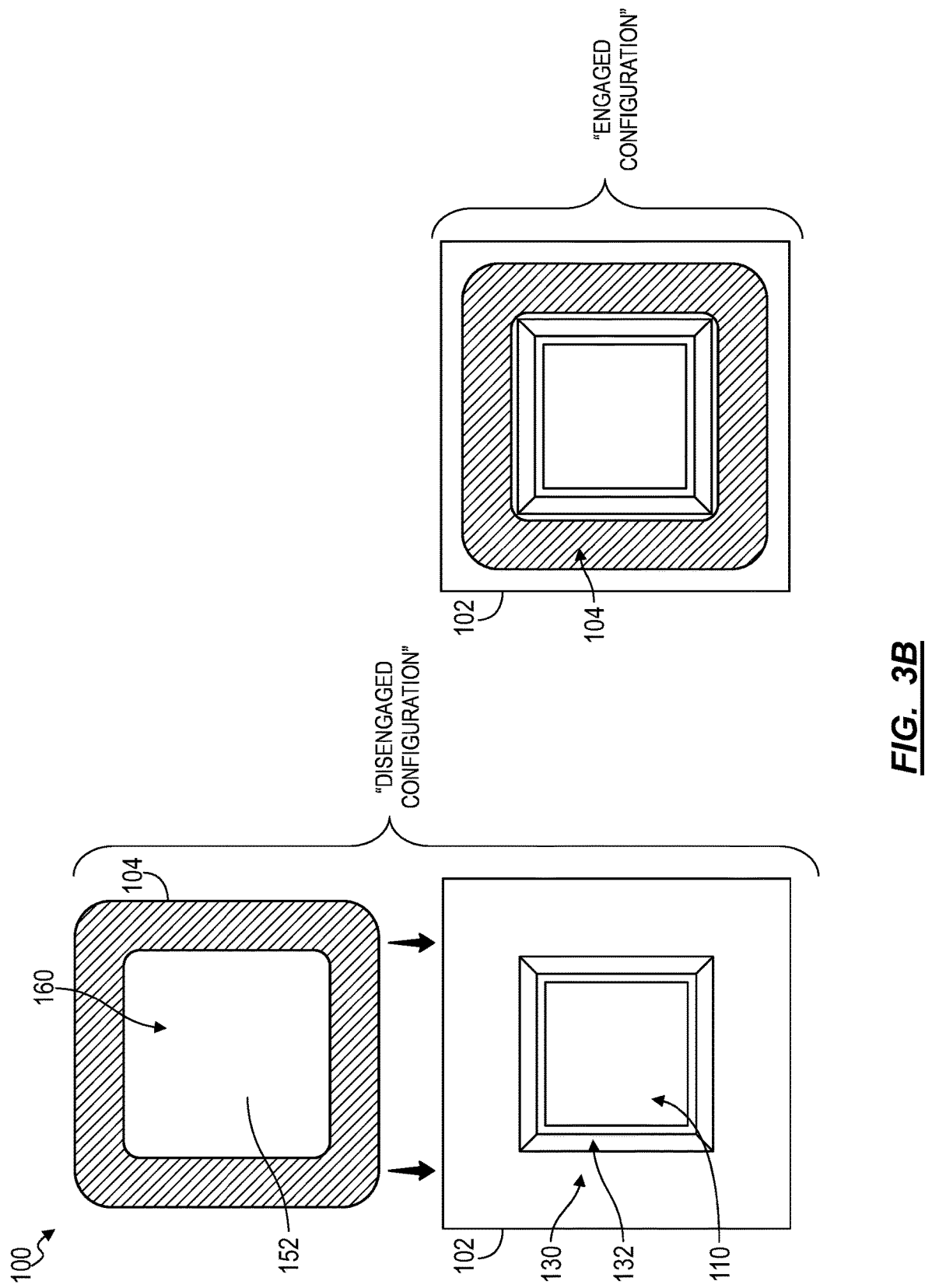

As shown in FIG. 1B, before the system 100 executes the method S100, the user may fasten the separation membrane 160 between the lower member 156 and upper member 155. Once the separation membrane 160 is fastened between the upper member 155 and lower member 156 of the build tray, the user may lower the tray assembly 104 over the upper surface of the window platform 132 and the build window no. As shown in FIGS. 3A AND 3B, the tray then kinematically aligns with the reference features 134 of the base assembly 102, thereby engaging with the base assembly 102. In the passive lamination variation, when the tray assembly 104 and the base assembly 102 are engaged the separation membrane 160 is tensioned flush against the surface of the build window 110 and covers the fluid distribution channel 142. In this variation, the separation membrane 160 also forms a fluid-impermeable seal (within the maximum operating pressure of the system) against an interstitial gasket 170 arranged along the edge of the window platform 132 or with the edge of the window platform 132 itself. In the active lamination gasket variation of the system, the separation membrane 160 is positioned just above the build window 110 upon kinematic alignment of the tray assembly 104 with the tray seat 130 of the base assembly 102.

Before or after the tray assembly 104 is engaged with the base assembly 102, resin is loaded into the volume defined by the upper member 155 of the build tray and the separation membrane 160. If the resin is not sensitive to oxygen and/or ambient air, the resin may be poured directly into the build tray. However, if the resin is sensitive to oxygen, humidity, and/or ambient air, the resin can be injected into a tray assembly 104 through a sealed port in a sealed build chamber after the build chamber has been filled with an inert fluid.

Thus, after loading is complete, the build volume defined by the inner surface of the build tray is at least partially occupied by a volume of resin. The resin is in contact with the upper surface of the separation membrane 160 and the inner surface of the upper member of the tray assembly 104. However, the resin does not come into contact with the build window 110 underneath the separation membrane 160.

5. Build Cycle

Figure 2:
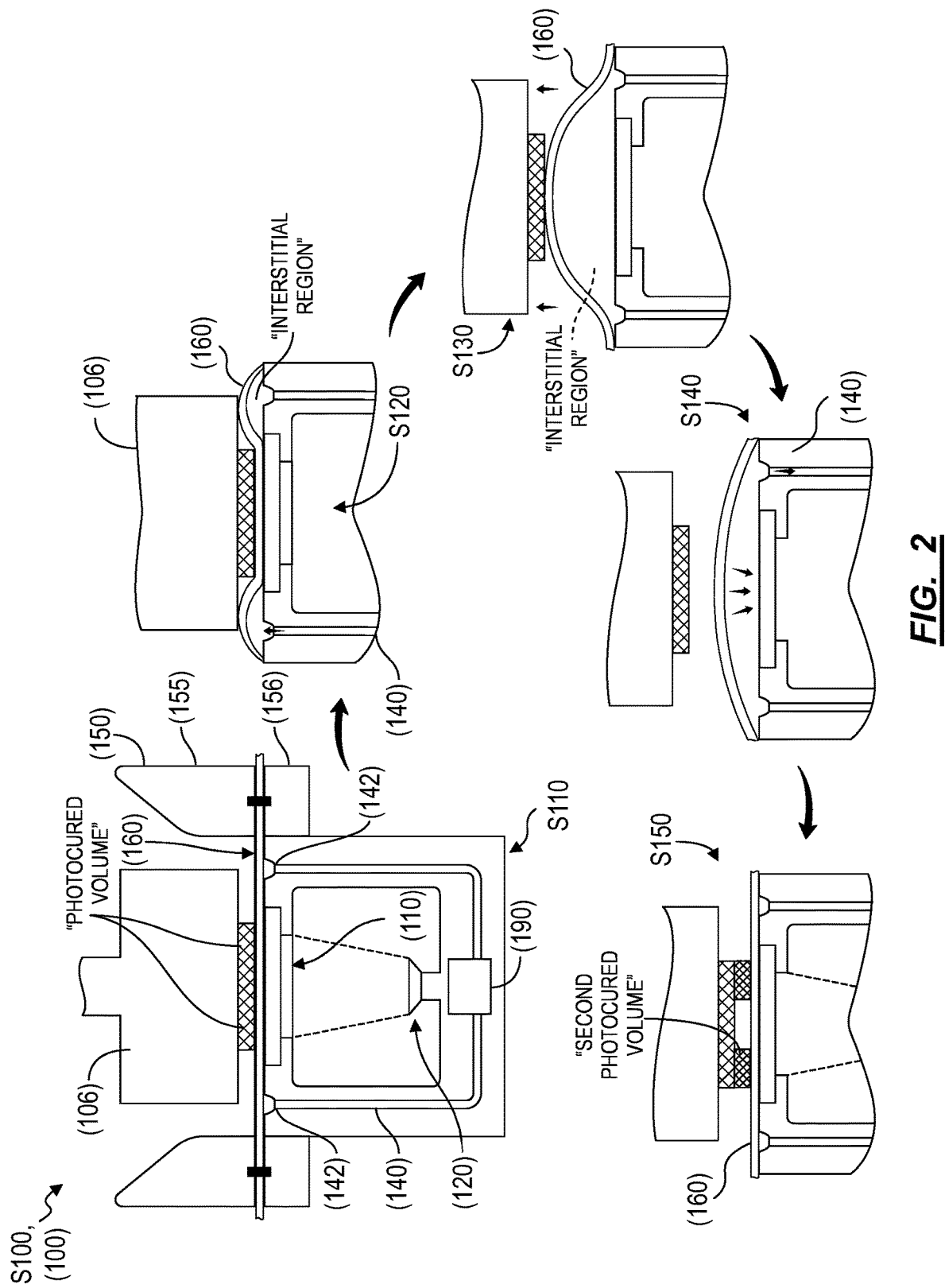
FIG. 2 is a flowchart representation of a method.

As shown in FIG. 2, in Block S110, the system 100 selectively photocures a first volume of resin to form a first layer of a build, wherein the build adheres to the build platform 106 opposite the separation membrane 160. Generally, once the build platform 106 has lowered into the resin at a height above the separation membrane 160 equal to a desired layer thickness of the first layer of the build, the controller instructs the projection system 120 to irradiate selective areas of the resin between the separation membrane 160 and the build platform 106 corresponding to a cross-sectional first layer of a build. The resin is configured to cure upon exposure to the emissive spectrum of the projection system 120. Thus, the resin cures within the selective areas irradiated by the projection system 120, thereby strongly adhering to the build platform 106 and minimally adhering to the separation membrane 160. Additionally, the separation membrane 160 may adhere to the build window 110 proximal to photocured features of the first layer due to adhesion forces (e.g., Stefan adhesion and suction forces) between the separation membrane 160 and the build window no.

The system 100 can execute Blocks S120, S130, and S140 of the method S100 to distribute separation forces—between a photocured resin layer of a build and the separation membrane 160—across the resin layer by increasing fluid pressure in an interstitial region between the separation membrane 160 and the build window no prior to or during retraction the build platform 106 away from the build window no. By distributing separation forces across the photocured resin layer, the system 100 may thus minimize peak forces at any one location across the photocured resin layer, thereby reducing opportunity for damage or deformation of this layer or previously photocured layers of the build in their green states. Additionally, the distribution of separation forces enables the use of resins exhibiting lower green strengths. Furthermore, by actively drawing the separation membrane 160 down across the flat, rigid build window 110 and removing substantially all fluid therebetween, the system 100 can: rapidly prepare for a subsequent resin layer; and consistently achieve a flat surface facing the build platform 106 and exhibiting high parallelism to the build platform 106. Therefore, the system 100 can execute the method S100 to produce resin layers of consistent, controlled thickness and produce highly accurate builds with a high degree of repeatability across discrete builds and in less time.

In Blocks S120, S130, and S140, as shown in FIG. 2, the system 100 separates the separation membrane 160 from the build window 110 and subsequently the photocured layer of the build from the separation membrane 160 in order to reposition the build platform 106 in preparation for photocuring a second layer. Generally, in Blocks S120, S130, and S140, the system 100 executes a separation process after curing a current layer of the build, including: inflating the interstitial region between the separation membrane 160 and the build window 110; retracting (e.g., raising) the build platform 106 vertically upward away from the build window 110; and depressurizing the region between the separation membrane 160 and the build window 110 in order to draw the separation membrane 160 down onto and flat against the build window 110. As described below, the system 100 can execute Blocks S120, S130, S140 in a synchronized sequence—such as during discrete or (partially-) overlapping time periods—in order to repeatably separate the current layer of the build from the separation membrane 160 and with minimal damage or deformation of the build in its green state.

While selectively curing a current layer of resin in Block S110, the system 100 minimizes the interstitial space between the build window 110 and the separation membrane 160 in order to repeatably maximize flatness and planarity of the outer surface of the separation. For example, prior to executing Block S110, the controller can trigger the pressure regulation system 190 to draw a vacuum on this interstitial region in order to flatten the separation membrane 160 across the build window 110. The pressure regulation system 190 can also continue to draw vacuum on the interstitial space between the build window no and the separation membrane 160—via an outlet port of the fluid distribution channel 142—in order to maintain contact between the build window 110 and the separation membrane 160 during Block S110. By drawing vacuum on this interstitial space before and/or during Block S110, the system 100 can thus remove voids or spaces (i.e. bubbles) from between the build window no and the separation membrane 160 and ensure that the separation membrane 160 is seated flush against the surface of the build window 110.

Following photocuring of the current layer of the build in Block S110, the system 100 can execute Block S120, including triggering the pressure regulation system 190 to drive a fluid (e.g., air, oxygen, an inert gas) into the interstitial region between the build window 110 and the separation membrane 160 via the inlet port of the fluid distribution channel 142. When the interstitial region is thus pressurized, the separation membrane 160 may begin to expand and to delaminate from the surface build window 110, such as from the perimeter of the build window 110 toward features of the current layer of the build that were cured in Block S110 (hereinafter "layer features"). The separation membrane 160 may thus exert a distributed circumferential "prying" force around the perimeter of each distinct layer feature in the current layer of the build. For example, the pressure regulation system 190 can pressurize the interstitial region up to a pressure of 300 pascals, which may overcome adhesion forces (e.g., Stefan adhesion and suction forces) between the build window 110 and the separation membrane 160.

Furthermore, in Block S120, the system 100 can also retract the build platform 106 in coordination with the inflation of the interstitial region by the pressure regulation system 190 in order to separate the separation membrane 160 from the build window 110 and to separate the layer features from the separation membrane 160.

In Block S130, the build platform 106 retracts vertically upward away from the build window 110. More specifically, the controller instructs the linear actuation system coupled to the build platform 106 to exert an upward force in order to separate the build from the build window no and move the build upward. In one implementation, the system 100 applies force, via the linear actuation system, over time according to a material-specific force profile consistent with the target green strength and geometry of the build. When the sum of the upward force exerted by the build platform 106 and the prying force of the fluid inflating the interstitial space between the separation membrane 160 and the build window no is sufficient to overcome adhesion forces (e.g., Stefan adhesion and suction forces) adhering the separation membrane 160 to the build window no, the separation membrane 160 may separate from the build window no and begin rising upward with the build platform 106 while still adhered to the bottom surface of the newly cured layer of the build.

The system 100 can detect the instant at which the separation membrane 160 separates from the build window no (e.g., by measuring a change in the force applied by the linear actuation system coupled to the build platform 106) and can continue to actuate the build platform 106 upward in order to separate the separation membrane 160 from the build. As the build platform 106 actuates away from the build window no, the separation membrane 160 may continue to stretch while adhered to the rising build. However, the rising build platform 106 increases the force angle between the bottom surface of the build and the separation membrane 160, which may cause the separation membrane 160 to peel away from the build.

In Block S140, the pressure regulation system 190 depressurizes the interstitial region between the build window no and the separation membrane 160, thereby pulling the separation membrane 160 taught across the surface of the build window 110 before photocuring the next layer of the build. Additionally, by pulling the separation membrane 160 downward toward the build window no, the system 100 can increase the rate of separation between the separation membrane 160 and the build. Furthermore, by depressurizing the interstitial region between the separation region and the build window no, the system 100 ensures that the separation membrane 160 is laminated against the build window no such that there are no bubbles or wrinkles in the separation membrane 160 before the system 100 photocures a second layer in Block S150.

Upon execution of Blocks S120, S130, and S140, the system 100 executes Block S150 to photocure a second layer of the build. Generally, in Block S150, the system 100 actuates the build platform 106 and adhered build via the linear actuation system to a distance equal to the desired layer thickness above the upper surface of the separation membrane 160 such that the photocured volume of the subsequent layer is characterized by a thickness equal to the desired layer thickness. Once the system 100 actuates the build platform 106 to a target distance above the separation membrane 160, the system 100 selectively photocures a second volume of the resin between the surface of the layer features of the previous photocured layer and the upper surface of the separation membrane 160 corresponding to a second cross-section of the build (i.e. a second layer of the build). Upon photocuring the second layer of the build, the second layer strongly adheres to the first layer of the build while minimally adhering to the separation membrane 160.

Once the system 100 photocures a second layer of the build, the system 100 can again execute Blocks S120, S130, and S140 to separate the bottom surface of the second layer from the upper surface of the separation membrane 160 and the build window 110.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. An additive manufacturing system comprising:
a build window:
  facing a projection system;
  defining a lamination surface opposite the projection system; and
  configured to pass radiation, emitted by the projection system, through the lamination surface; and
a tray assembly comprising:
  a tray:
    comprising a perimeter support edge inwardly offset from an outer edge of the tray and defining an aperture; and
    configured to locate over and engage the build window with the aperture arranged about the build window and with the perimeter support edge offset above the lamination surface; and
  a separation membrane:
    extending across the aperture;
    tensioned over and against the perimeter support edge;
    operable in:
      a laminated position, the separation membrane laminated against the lamination surface, below the perimeter support edge, in the laminated position, responsive to evacuation of fluid from an interstitial region between the separation membrane and the lamination surface, to form a build surface offset below the perimeter support edge, and the perimeter support edge offset above the lamination surface by a first height in the laminated position; and
      an expanded position, the separation membrane forming a convex geometry offset above the perimeter support edge and offset above the lamination surface, in the expanded position to promote separation of the separation membrane from a layer of a resin polymerized over the build surface via radiation emitted by the projection system, and the perimeter support edge offset above the lamination surface by the first height in the expanded position;
  a fluid distribution port fluidly coupled to the interstitial region; and
  a fluid distribution channel circumscribing the build window and intersecting the fluid distribution port.

2. The additive manufacturing system of claim 1:
wherein the separation membrane forms the convex geometry offset above the lamination surface in the expanded position responsive to pumping of fluid into the interstitial region between the separation membrane and the lamination surface.

3. The additive manufacturing system of claim 1:
further comprising a second tray assembly comprising:
  a second tray:
    comprising a second perimeter support edge defining a second aperture; and
    configured to locate over the build window, in replacement of the tray assembly, with the second aperture arranged about the build window and with the second perimeter support edge approximately coplanar the lamination surface; and
  a second separation membrane:
    extending across the aperture;
    tensioned against the second perimeter support edge of the second tray; and operable in:
  a second laminated position, the second separation membrane laminated against the lamination surface in the second laminated position, responsive to evacuation of fluid from a second interstitial region between the second separation membrane and the lamination surface, to form a second build surface approximately coplanar with the second perimeter support edge; and
  a second expanded position, the second separation membrane forming a second convex geometry above the second perimeter support edge and offset above the lamination surface in the second expanded position to promote separation of the second separation membrane from a second layer of a second resin polymerized over the second build surface via radiation emitted by the projection system.

4. The additive manufacturing system of claim 1:
wherein the separation membrane is laminated against the lamination surface to form the build surface comprising a planar build surface in the laminated position.

5. The additive manufacturing system of claim 1:
wherein the separation membrane is operable in the laminated position responsive to evacuation of fluid comprising air from the interstitial region; and
wherein the separation membrane is operable in the expanded position responsive to pumping of fluid comprising air into the interstitial region.

6. The additive manufacturing system of claim 1:
wherein the tray further comprises:
  a lower member defining:
    the perimeter support edge; and
    a perimeter relief encircling and inwardly offset from the perimeter support edge; and
  an upper member:
    comprising a perimeter tongue; and
    configured to assemble over the lower member:
      with the separation membrane located between the lower member and the upper member, a portion of the separation membrane interposed between the perimeter relief and the perimeter tongue;
      with the perimeter tongue inserted into the perimeter relief; and
      with the perimeter tongue cooperating with the perimeter support edge to tension the separation membrane across the aperture.

7. The additive manufacturing system of claim 1:
wherein the tray further defines a parapet:
  extending above and encircling the aperture; and
  cooperating with the separation membrane to form a vessel configured to store a volume of the resin.

8. The additive manufacturing system of claim 1, further comprising:
a pressure regulation system configured to:
  pump fluid into the interstitial region, via the fluid distribution port, to transition the separation membrane into the expanded position; and
  evacuate fluid from the interstitial region, via the fluid distribution port, to transition the separation membrane into the laminated position.

9. The additive manufacturing system of claim 1, wherein the tray defines the fluid distribution port proximal the perimeter support edge.

10. The additive manufacturing system of claim 1:
wherein the separation membrane comprises a copolymerized tetrafluoroethylene film transparent to radiation, emitted by the projection system, at wavelengths within a wavelength range corresponding to initiation of polymerization of the resin; and
wherein the build window comprises a rigid structure transparent to radiation, emitted by the projection system, at wavelengths within the wavelength range.

11. The additive manufacturing system of claim 1:
wherein the separation membrane is characterized by a first elasticity; and
further comprising a second tray assembly comprising:
  a second tray:
    comprising a second perimeter support edge inwardly offset from a second outer edge of the second tray and defining a second aperture; and
    configured to locate over and engage the build window, in replacement of the tray assembly, with the second aperture arranged about the build window; and
  a second separation membrane:
    characterized by a second elasticity greater than the first elasticity;
    extending across the aperture;
    tensioned against the second perimeter support edge; and
    operable in:
      a second laminated position, the second separation membrane laminated against the lamination surface, below the perimeter support edge, in the second laminated position, responsive to evacuation of fluid from a second interstitial region between the second separation membrane and the lamination surface, to form a second build surface offset below the second perimeter support edge, and the second perimeter support edge offset above the lamination surface by a second height in the second laminated position; and
      a second expanded position, the second separation membrane forming a second convex geometry offset above the build window and the second perimeter support edge in the second expanded position to promote separation of the second separation membrane from a second layer of a second resin polymerized over the second build surface via radiation emitted by the projection system, and the second perimeter support edge offset above the lamination surface by the second height in the second expanded position.

12. A tray assembly configured to interface with a build window arranged in an additive manufacturing system, facing a projection system, and defining a lamination surface opposite the projection system, the tray assembly comprising:
a tray:
  comprising a perimeter support edge defining an aperture inwardly offset from an outer edge of the tray and; and
  configured to locate over and engage the build window with the aperture arranged about the build window and with the perimeter support edge offset above the lamination surface of the build window; and
a separation membrane:
  extending across the aperture;
  tensioned against the perimeter support edge of the tray; and operable in:
   a laminated position, the separation membrane laminated against the lamination surface in the laminated position, responsive to evacuation of fluid from an interstitial region between the separation membrane and the lamination surface, to form a build surface offset below the perimeter support edge, and the perimeter support edge offset above the lamination surface by a first height in the laminated position; and
   an expanded position, the separation membrane forming a convex geometry offset above the perimeter support edge and offset above the lamination surface in the expanded position to promote separation of the separation membrane from a layer of a resin polymerized over the build surface via radiation emitted by the projection system, and the perimeter support edge offset above the lamination surface by the first height in the expanded position;
a fluid distribution port fluidly coupled to the interstitial region; and
a fluid distribution channel circumscribing the build window and intersecting the fluid distribution port.

13. The tray assembly of claim 12:
wherein the separation membrane forms the convex geometry offset above the lamination surface in the expanded position responsive to pumping of fluid into the interstitial region between the separation membrane and the lamination surface.

14. The tray assembly of claim 12:
wherein the tray defines the fluid distribution port arranged proximal the perimeter support edge and configured to couple to a pressure regulation system, the pressure regulation system arranged in the additive manufacturing system and configured to:
   pump fluid into the interstitial region, via the fluid distribution port, to transition the separation membrane into the expanded position; and
   evacuate fluid from the interstitial region, via the fluid distribution port, to transition the separation membrane into the laminated position.

15. The tray assembly of claim 12, wherein the tray further comprises:
a lower member defining:
   the perimeter support edge; and
   a perimeter relief encircling and inwardly offset from the perimeter support edge; and
an upper member:
   comprising a perimeter tongue; and
   configured to assemble over the lower member:
      with the separation membrane located between the lower member and the upper member;
      with the perimeter tongue inserted into the perimeter relief, extending below the perimeter support edge, and outwardly offset from the perimeter support edge; and
      with the perimeter tongue cooperating with the perimeter support edge to tension the separation membrane across the aperture.

16. A tray assembly comprising:
a tray:
   configured to locate over and engage a build window of an additive manufacturing system, the additive manufacturing system comprising a projection system configured to project radiation through the build window, the build window defining a lamination surface opposite the projection system; and
   comprising:
      a lower member defining:
         an aperture;
         a perimeter support edge facing the aperture and configured to seat offset above the lamination surface; and
         a perimeter relief encircling and inwardly offset from the perimeter support edge; and
      an upper member:
         comprising a perimeter tongue; and
         configured to assemble over the lower member with the perimeter tongue inserted into the perimeter relief and extending below the perimeter support edge; and
a separation membrane:
   extending across the aperture, the perimeter support edge, and the perimeter relief, a portion of the separation membrane interposed between the perimeter relief and the perimeter tongue;
   tensioned across the aperture by the perimeter support edge and the perimeter relief via assembly of the upper member onto the lower member; and
   operable in:
      a laminated position, the separation membrane laminated against the lamination surface in the laminated position, responsive to evacuation of fluid from an interstitial region between the separation membrane and the lamination surface, to form a build surface offset below the perimeter support edge, and the perimeter support edge offset above the lamination surface by a first height in the laminated position; and
      an expanded position, the separation membrane forming a convex geometry above the lamination surface and the perimeter support edge in the expanded position to promote separation of the separation membrane from a layer of a resin polymerized over the build surface via radiation emitted by the projection system and transmitted through the build window and the separation membrane, and the perimeter support edge offset above the lamination surface by the first height in the expanded position;
a fluid distribution port fluidly coupled to the interstitial region; and
a fluid distribution channel circumscribing the build window and intersecting the fluid distribution port.

17. The tray assembly of claim 16:
wherein the tray defines the fluid distribution port extending proximal the perimeter support edge and configured to couple to a pressure regulation system, the pressure regulation system arranged in the additive manufacturing system and configured to:
   pump fluid into the interstitial region, via the fluid distribution port, to transition the separation membrane into the expanded position; and
evacuate fluid from the interstitial region, via the fluid distribution port, to transition the separation membrane into the laminated position.

18. The additive manufacturing system of claim 16:
wherein the separation membrane defines:
   a membrane perimeter; and
   a set of perforations proximal and inset from the membrane perimeter; and wherein the tray assembly further comprises a set of tensioning posts:
- extending between the lower member and the upper member;
- outwardly offset from the perimeter tongue and the perimeter relief;
- configured to receive the set of perforations to position the separation membrane between the lower member and upper member; and
- configured to:
  - laterally retain the separation membrane via the set of perforations during assembly of the upper member onto the lower member; and
  - tension the separation membrane across the aperture.

19. The additive manufacturing system of claim 16, wherein the perimeter support edge comprises a radiused edge in contact with the separation membrane in the laminated position.

20. The additive manufacturing system of claim 16:
wherein the separation membrane forms the convex geometry above the perimeter support edge and offset above the lamination surface in the expanded position responsive to pumping of fluid into the interstitial region between the separation membrane and the lamination surface.

* * * * *